US008874463B2

(12) United States Patent
Marchman et al.

(10) Patent No.: US 8,874,463 B2
(45) Date of Patent: Oct. 28, 2014

(54) TROUBLE TICKET MANAGEMENT SYSTEM

(75) Inventors: Drenda L. Marchman, Birmingham, AL (US); Linda H. Ball, Lawrenceville, GA (US); Jeremy W. Walker, Warrior, AL (US); Rodney C. Granger, Birmingham, AL (US); Charles C. Lutz, Flowery Branch, GA (US)

(73) Assignee: AT&T Intellectual Property, L.P., Atlanta, GA (US)

( * ) Notice: Subject to any disclaimer, the term of this patent is extended or adjusted under 35 U.S.C. 154(b) by 1441 days.

(21) Appl. No.: 12/171,391

(22) Filed: Jul. 11, 2008

(65) Prior Publication Data

US 2010/0010848 A1  Jan. 14, 2010

(51) Int. Cl.
*G06Q 10/06* (2012.01)
*G06Q 30/04* (2012.01)

(52) U.S. Cl.
CPC ............ *G06Q 10/06* (2013.01); *G06Q 10/0631* (2013.01); *G06Q 30/04* (2013.01)
USPC .......................................................... 705/8

(58) Field of Classification Search
None
See application file for complete search history.

(56) References Cited

U.S. PATENT DOCUMENTS

2004/0120250 A1* 6/2004 Langevin et al. ............. 370/216

* cited by examiner

*Primary Examiner* — Shay S Glass
(74) *Attorney, Agent, or Firm* — Gardner Groff Greenwald & Villanueva, P.C.

(57) ABSTRACT

Management of trouble tickets for a circuit is provided. A method and system provides a plurality of management tools that enable a user to obtain, verify, and manage information related to a trouble ticket to ensure compliance with federal standards and proper resolution and billing for problems experienced for a customer. With the method and system, the user may open a trouble ticket, close the trouble ticket, and bill a customer for services associated with resolving the trouble ticket.

20 Claims, 27 Drawing Sheets

You selected "Circuit Taking Errors." Ask the customer the following questions, obtaining as much information as possible. Your entries will be added to the activity log (OSSLOG).

How long before errors are taken?:
[5 minutes]

On what test pattern(s) are errors detected?:
[QRSS]

Ask the customer if it is OK to test and dispatch, then check each box accordingly. This step is necessary to ensure accurate billing and ticket handling.

☑ OK to test the circuit now? Check if Yes
☑ OK to dispatch now? Check if Yes

Select the current day of the week:
[Monday-Friday ▶]

Enter any additional info such as local contact, access requirements, or customer test results if needed. Note: This field is limited by the WFA/C report line. Some characters may be truncated. Abbreviate where necessary.

Enter additional information here:

Enter any additional info to be added as a remark in the activity log (OSSLOG):

Remarks (RMK):

Note: The trouble ticket will be opened after clicking Next. Any changes should be made before proceeding. Clicking Back after this step could result in errors.

View the circuit history for items to note.
Click Next after entering any additional info.

Circuit History:

| Tracking Key/TR # | Action | Order Number | Report Ca... | EXC | BI | Data | Status | Due/Received |
|---|---|---|---|---|---|---|---|---|
| SES301618001 | R | SES301618 | | | | | IE | 03/24/05 |
| CS103405 | | | Customer... | ☐ | | ☐ | CAN | 09/27/06 14:10 |
| CS103407 | | | Customer... | ☐ | | ☐ | CAN | 09/27/06 14:12 |
| CS103403 | | | Customer... | ☐ | | ☐ | CAN | 09/27/06 13:45 |
| CS103382 | | | Customer... | ☐ | | ☐ | IEC | 09/27/06 10:11 |
| CS103379 | | | Customer... | ☐ | | ☐ | INF | 09/27/06 09:31 |
| CS103378 | | | Customer... | ☐ | M | ☐ | CAN | 09/27/06 09:00 |
| CS103375 | | | Customer... | ☐ | | ☐ | INF | 09/27/06 08:39 |
| CS103374 | | | Customer... | ☐ | | ☐ | INF | 09/27/06 07:58 |
| CS103373 | | | Customer... | ☐ | | ☐ | INF | 09/27/06 07:37 |
| CS103361 | | | Customer... | ☐ | | ☐ | INF | 09/26/06 20:58 |
| CS103358 | | | Customer... | ☐ | | ☐ | CAN | 09/26/06 18:21 |
| CS103356 | | | Customer... | ☐ | | ☐ | CAN | 09/26/06 17:53 |
| CS103352 | | | Customer... | ☐ | | ☐ | INF | 09/26/06 16:31 |

☐ Checked circuit history? Check if Yes

Anything to add concerning the history?:

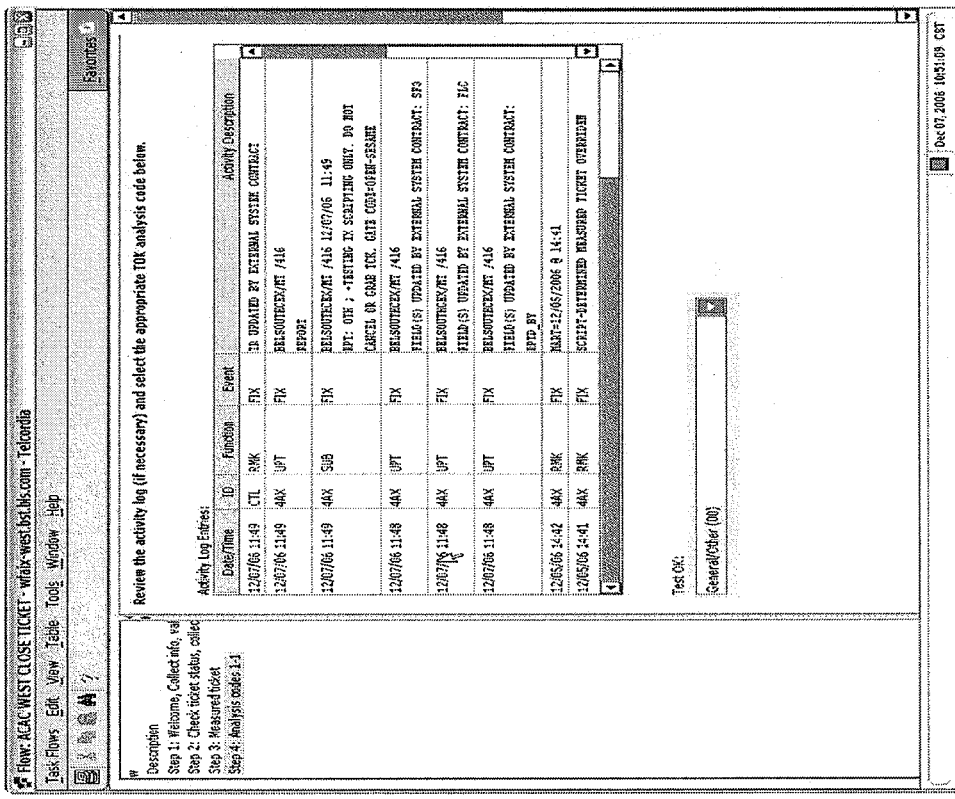
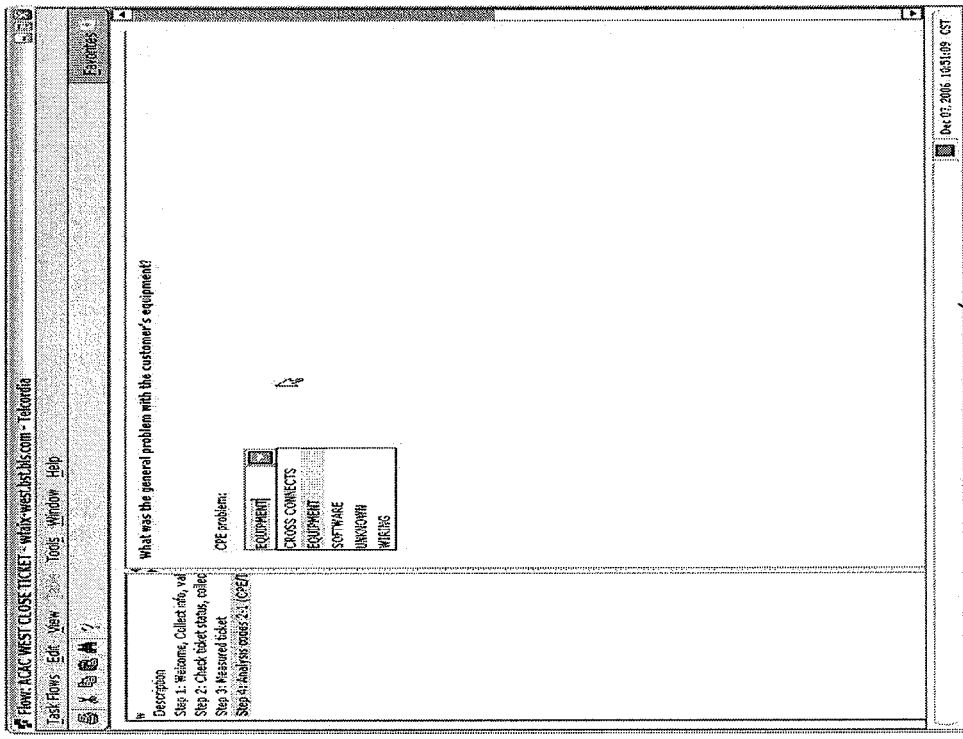
FIG. 20

TROUBLE TICKET MANAGEMENT SYSTEM

BACKGROUND

A trouble ticket is a system for tracking the detection, reporting, and resolution of some kind of problems. Often when addressing trouble tickets in a telecommunications network customer service center (service center), for example, detailing problems encountered while using communications over the communications network is necessary for ensuring good customer service by promptly diagnosing and correcting the problems encountered by the customer. However, technicians at the service center must generate a trouble ticket that accurately reflects problems conveyed to the technician by the customer. For example, a technician may generate a trouble ticket stating that a T1 communication line is not operating properly. However, merely stating that a T1 line is not operating properly does not reflect a customer's desire on how this problem should be addressed. Accordingly, the technician's input of a generic problem to create a trouble ticket may lead to an incorrect closing of the trouble ticket because the customer's problem is not addressed. Incorrectly closing a trouble ticket may lead to inaccurate reporting of trouble tickets to government agencies, for example, the Federal Communications Commission, inaccurate billing for service related to discharging the trouble ticket, and closing a trouble ticket prior to completely addressing communications problems reported by the customer.

SUMMARY

According to exemplary embodiments, a trouble ticket management system is provided. Disclosed embodiments include a method and a system for managing a trouble ticket for a circuit. The method and system receives service type and circuit identification (ID) information for the circuit, and also receives service type information for the circuit. The method and system verifies the circuit type, the circuit ID and the service type, and also receives circuit performance information for the circuit. The method and system generate a trouble ticket based on the obtained information.

Embodiments also include a computer-readable medium that stores a set of instructions which, when executed, performs a method for managing a trouble ticket for a circuit. The stored instructions determine whether an open ticket for the circuit exists. If an open ticket for the circuit does exist, the stored instructions determine whether the trouble ticket is a measured trouble ticket or a non-measured trouble ticket. The stored instructions determine a trouble ticket code for the open trouble ticket, and determine whether billing information is associated with the open trouble ticket. The stored instructions attempt to obtain a mutually agreed-upon restoral time approval from a customer. The stored instructions also verify information associated with the open trouble ticket and close the open trouble ticket.

Other systems, methods, and/or computer program products according to embodiments will be or become apparent to one with skill in the art upon review of the following drawings and detailed description. It is intended that all such additional systems, methods, and/or computer program products be included within this description, be within the scope of the present invention, and be protected by the accompanying claims.

BRIEF DESCRIPTION OF THE DRAWINGS

FIG. 7 is a screen shot further illustrating an exemplary open ticket process using the user interface shown in FIG. 5;

FIG. 9 is a screen shot further illustrating an exemplary open ticket process using the user interface of FIG. 5;

FIG. 11 is a screen shot further illustrating an exemplary open ticket process using the user interface of FIG. 5;

FIG. 12 is a screen shot further illustrating an exemplary open ticket process using the user interface of FIG. 5;

FIG. 14 is a screen shot further illustrating an exemplary open ticket process using the user interface of FIG. 5;

FIG. 16 is a screen shot further illustrating an exemplary close ticket process using the user interface of FIG. 5;

FIG. 17 is a screen shot further illustrating an exemplary close ticket process using the user interface of FIG. 5;

FIG. 19 is a screen shot further illustrating an exemplary close ticket process using the user interface of FIG. 5;

FIG. 20 is a screen shot further illustrating an exemplary close ticket process using the user interface of FIG. 5;

FIG. 22 is a screen shot further illustrating an exemplary close ticket process using the user interface of FIG. 5;

FIG. 23 is a screen shot further illustrating an exemplary close ticket process using the user interface of FIG. 5;

FIG. 24 is a screen shot further illustrating an exemplary close ticket process using the user interface of FIG. 5;

FIG. 26 is a screen shot further illustrating an exemplary close ticket process using the user interface of FIG. 5.

DETAILED DESCRIPTION

Figure 1:
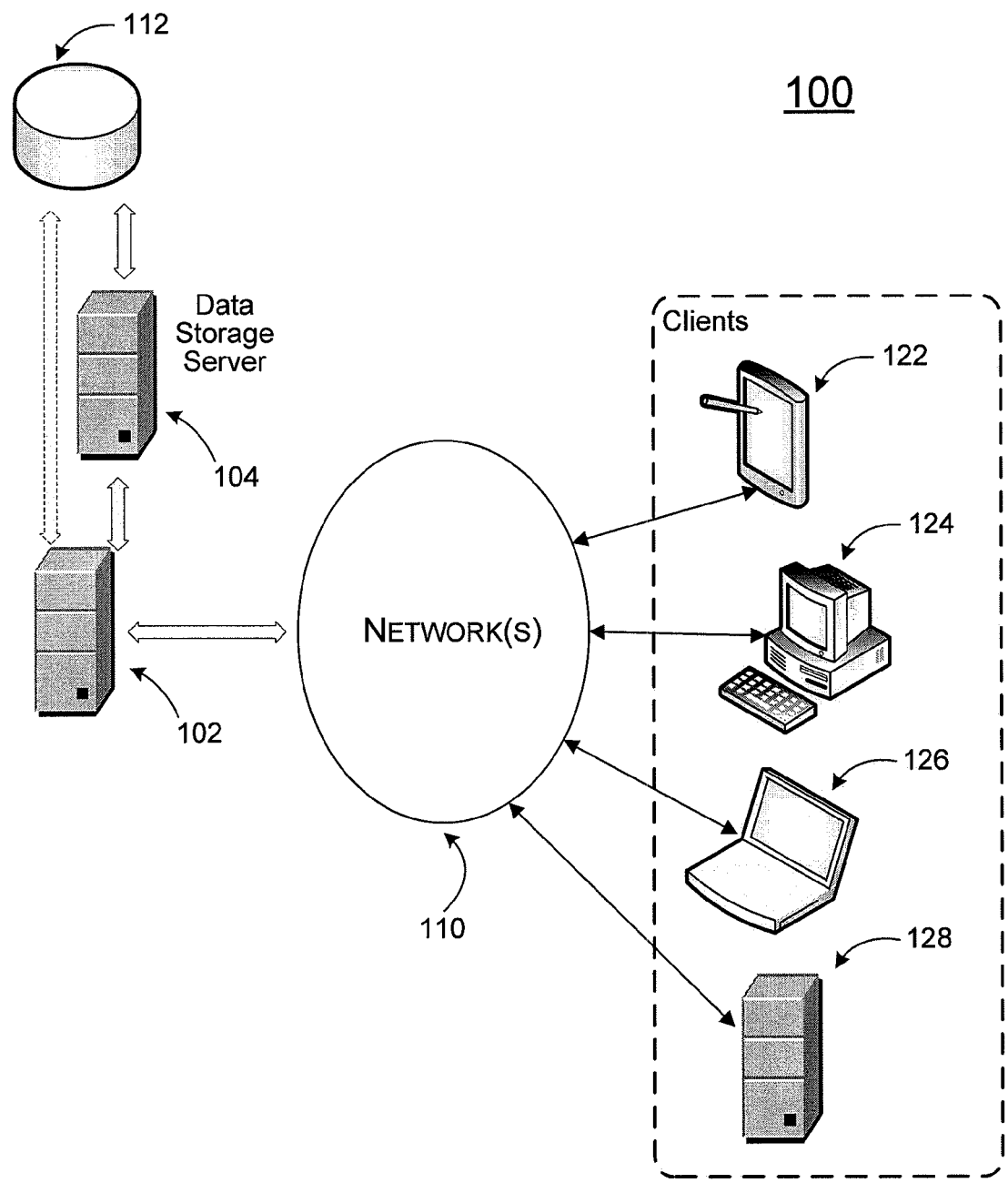
FIG. 1 illustrates a networked operating environment where disclosed embodiments may be practiced.

The following detailed description refers to the accompanying drawings. Wherever possible, the same reference numbers are used in the drawings and the following description to refer to the same or similar elements. While embodiments of the invention may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the invention. Instead, the proper scope of the invention is defined by the appended claims.

Embodiments of the present method, system, and computer readable medium for managing a trouble ticket for a circuit are disclosed. Often when managing trouble tickets for circuits in a telecommunications network, information input by a technician about problems experienced by a customer, or customer request regarding problems experienced may be vague or incorrectly input. Because the open trouble ticket does not properly reflect information associated with problems experienced by the customer, closing the trouble ticket may lead to incorrect reconciliation of the customer's problems, incorrect billing for services rendered in resolving the trouble ticket, or incorrect reporting of trouble tickets to the FCC. Accordingly, if the technician is provided with a centralized location to open and close trouble tickets using a variety of scripts and programs containing rules for trouble tickets, the technician may manage the trouble ticket more accurately and efficiently.

A disclosed embodiment of the system for managing a trouble ticket for a circuit may include an open ticket script for opening a trouble ticket for the circuit. The system also may include a close trouble ticket script for closing a trouble ticket, and a billing program and a billing script for associating billing information with the trouble ticket.

Referring to FIG. 1, a system 100 where example embodiments may be implemented is illustrated. System 100 may comprise any topology of servers, clients, Internet service providers, and communication media. Also, system 100 may have a static or dynamic topology. The term "client", as used herein, refers to a client application or a client device employed by a user to perform business logic operations. Computing devices within system 100 may use one or more programs or a server machine executing programs associated with managing one or more trouble tickets. Both clients and application servers may be embodied as single device (or program) or a number of devices (programs). Similarly, data sources may include one or more data stores, input devices, and the like.

A trouble ticket management application 220, described in more detail below with reference to FIG. 2, may be run centrally on a server 102 or in a distributed manner over several servers and/or client devices. For example, server 102 may be a web server which can utilize hypertext markup language (HTML), JAVA Script, and Microsoft® AST, and the like. A number of other applications may also be configured, deployed, and shared in system 100. In addition, the trouble ticket management application 220 may also be run in one or more client devices and information exchanged over network(s) 110.

Data store 112 is an example of a number of data stores that may be utilized to store copies of the data. Data store 112 may be managed by data storage server 104 or directly accessed by server 102 or any one of the clients. Various types of data may be created, edited and processed during the management of one or more trouble tickets, which may be stored in data store 112.

Users may interact with server 102 by running the trouble ticket management application 220 from client devices 122, 124, 126, and 128 over network(s) 110. In one embodiment, portions or all of the trouble ticket management application 220 may reside on any one of the client devices 122, 124, 126, and 128. In such an embodiment, data may be stored in data store 112 without an involvement of server 102. According to disclosed embodiments, users may be provided one or more user interfaces (UIs) to select and define configurations associated with the management of trouble tickets.

Network(s) 110 may include a secure network such as an enterprise network, or an unsecure network such as a wireless open network. Network(s) 110 provide communication between the nodes described above. By way of example, and not limitation, network(s) 110 may include wired media such as a wired network or direct-wired connection, and wireless media such as acoustic, RF, infrared and other wireless media. Many other configurations of computing devices, applications, and data storage may be employed to implement a trouble ticket management system.

Figure 2:
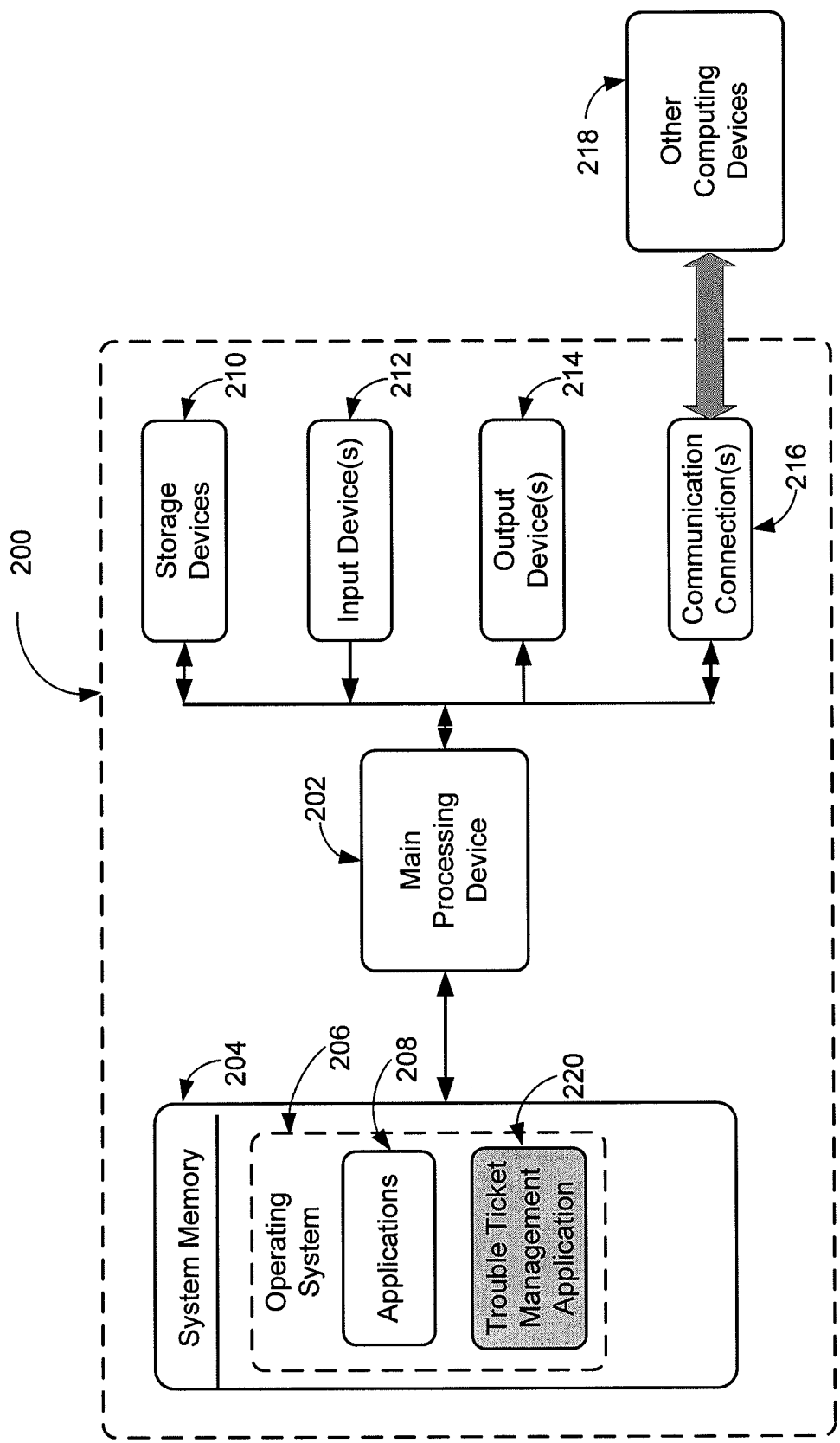
FIG. 2 is a block diagram illustrating an example of a system including a computing device.

With reference to FIG. 2, one example of a system for implementing the embodiments includes a computing device 200. Computing device 200 typically includes a main processing unit 202 and system memory 204. The system memory 204 may be volatile (such as RAM), non-volatile (such as ROM, flash memory, etc.) or some combination of the two. System memory 204 typically provides an environment for an operating system 206 to be executed for controlling the operation of computing device 200 and execution of other programs (applications). Software applications 208 and trouble ticket management application 220 are examples of programs or program modules that may be executed under the control of operating system 206 in system memory 204. Additional operating systems or programs may also be executed within system memory 204 outside the control of operating system 206. Trouble ticket management application 220 enables a user to manage one or more trouble tickets.

Trouble ticket management application 220 may be an integrated part of a file management application or a separate application. The trouble ticket management application 220 may communicate with other applications running on computing device 200 or on other devices. Furthermore, the trouble ticket management application 220 may be executed in an operating system other than operating system 206.

The computing device 200 may have additional features or functionality. For example, the computing device 200 may also include data storage devices 210 (removable and/or non-removable) such as, for example, magnetic disks, optical disks, or tape. Computer storage media may include volatile and nonvolatile, removable and non-removable media implemented in any method or technology for storage of information, such as computer readable instructions, data structures, program modules, or other data. System memory 204 and storage devices 210 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 200. Any such computer storage media may be part of device 200.

Computing device 200 may also include input device(s) 212 such as a keyboard, a mouse, a pen, a voice input device, a touch input device, etc. Furthermore, output device(s) 214 such as a display, a speaker, a printer, etc. may also be included.

Communication connections 216 may be included in computing device 200 to allow the device to communicate with other computing devices 218, such as over a network in a distributed computing environment, for example, an intranet or the Internet. Communication connection 216 exemplifies various communication media. Communication media may be embodied by computer readable instructions, data structures, program modules, or other data in a modulated data signal, such as a carrier wave or other transport mechanism, and include any information delivery media. By way of example, and not limitation, communication media may include wired media such as a wired network or direct-wired connection, and wireless media such as acoustic, RF, infrared and other wireless media. The term computer readable media as used herein refers to both storage media and communication media.

While the embodiments will be described in the general context of program modules that execute in conjunction with an application program that runs on an operating system on a personal computer, those skilled in the art will recognize that aspects may also be implemented in combination with other program modules.

Generally, program modules include routines, programs, components, data structures, and other types of structures that perform particular tasks or implement particular abstract data types. Moreover, embodiments may be practiced with other computer system configurations, including hand-held devices, multiprocessor systems, microprocessor-based or programmable consumer electronics, minicomputers, mainframe computers, and the like. Embodiments may also be practiced in distributed computing environments where tasks are performed by remote processing devices that are linked through a communications network. In a distributed computing environment, program modules may be located in both local and remote memory storage devices.

Embodiments may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process.

As stated above, a number of program modules and data files may be stored in system memory 204, including operating system 206. While executing on main processing unit 202, programming modules may perform processes including, for example, one or more stages of method 300 and one or more stages of method 400 as described below with reference to FIGS. 3 and 4. The aforementioned processes are an example, and main processing unit 202 may perform other processes. Other programming modules that may be used in accordance with embodiments of the present invention may include electronic mail and contacts applications, word processing applications, spreadsheet applications, database applications, slide presentation applications, drawing or computer-aided application programs, etc.

Figure 3:
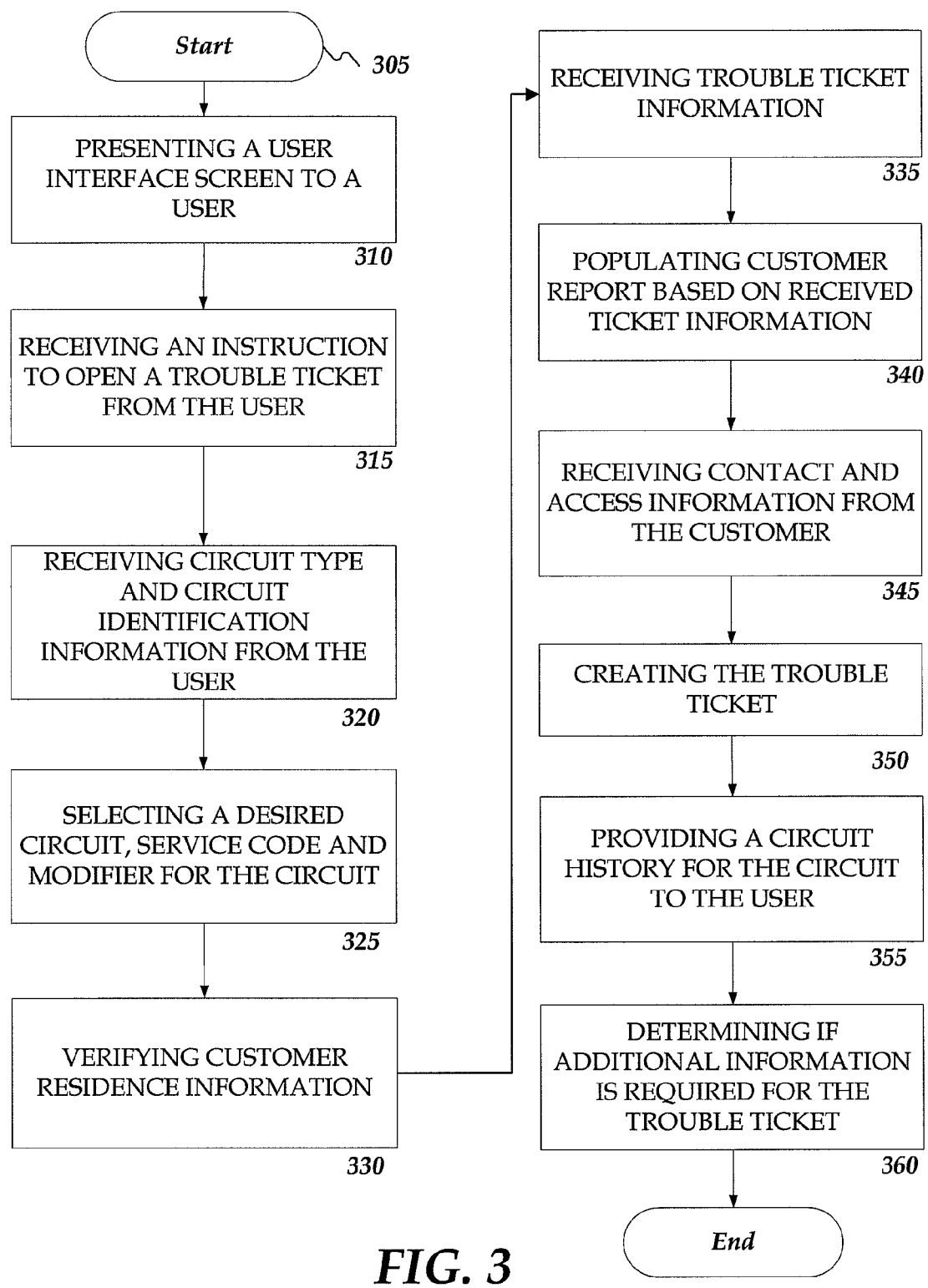
FIG. 3 is a flow chart illustrating a method for opening a trouble ticket for use with disclosed embodiments.

FIG. 3 is a flow chart setting forth the general stages involved in a method 300 performed by the trouble ticket management application 220 for opening and managing a trouble ticket for a circuit, using the computing device 200 of FIG. 2, according to an exemplary embodiment. Ways to implement the stages of method 300 will be described in greater detail below. Method 300 begins at starting block 305 and proceeds to stage 310 where computing device 200 presents a user interface screen to a user. Once the user interface is presented, the method 300 proceeds to stage 315 where the trouble ticket management application 220 receives an instruction from the user to open a trouble ticket for a circuit. Next, at stage 320, the trouble ticket management application 220 receives information about the circuit, for example, a circuit type and a circuit identification (ID) number to obtain information about the associated circuit.

Next, at stage 325, the trouble ticket management system receives the user's selection of a desired circuit displayed in response to entering a circuit ID and may enter a service code and circuit modifier for the circuit. At stage 330, the trouble ticket management application 220 verifies customer location information associated with the selected circuit. At stage 335, the trouble ticket management application 220 receives trouble ticket information associated with the circuit from the user. For example, the user may indicate whether problems stated by a customer are sectionalized to a particular section of a telecommunications network, whether problems experienced by the customer are chronic, or the like.

At stage 340, the trouble ticket management application 220 populates portions of a trouble ticket based on received ticket information. For example, trouble ticket management application 220 may populate error information associated with the circuit. At stage 345, the trouble ticket management application 220 receives customer contact information and information related to access at the residence or other location of the customer. At stage 350, the trouble ticket management application 220 creates the trouble ticket. Once the trouble ticket is created, at stage 355, trouble ticket management application 220 provides the user with a service history and comments about the circuit. At stage 360, the trouble ticket management application 220 determines if any additional information related to the circuit is required using a response input by the user.

Figure 4:
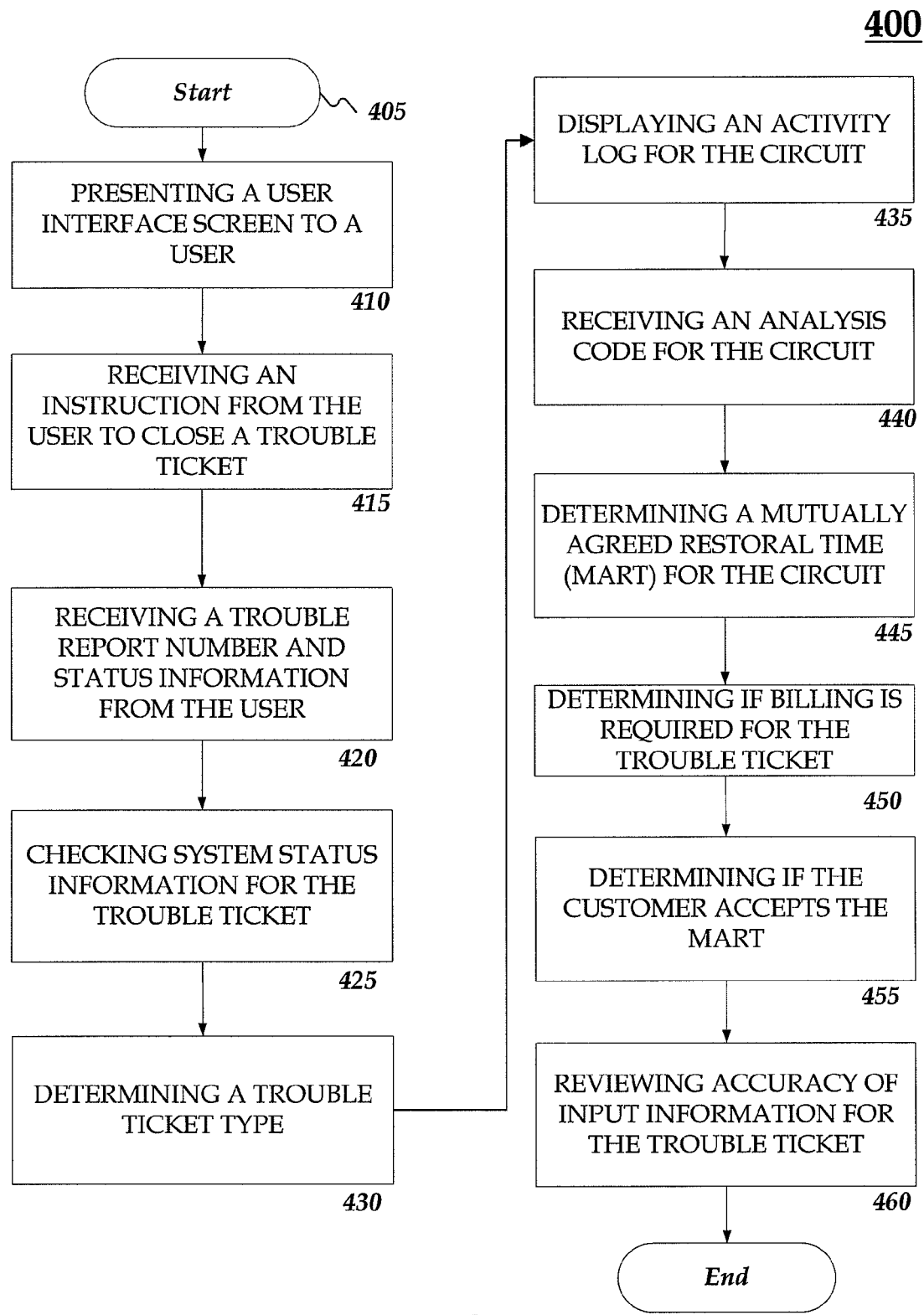
FIG. 4 is a flow chart of a method for closing a trouble ticket for use with disclosed embodiments.

FIG. 4 is a flow chart setting forth the general stages involved in a method 400 performed by the trouble ticket management application 220 for managing a trouble ticket for a circuit using computing device 200 of FIG. 2, according to an exemplary embodiment. The method 400 closes a trouble ticket. Ways to implement the stages of method 400 will be described in greater detail below. Method 400 begins at starting block 405 and proceeds to stage 410 where computing device 200 presents a user interface screen to a user. Once the user interface is presented, the method 400 proceeds to stage 415 where the trouble ticket management application 220 receives instructions from the user to close a trouble ticket. At stage 420, the trouble ticket management application 220 obtains trouble ticket information, for example, a trouble report number, from the user. At stage 425, the trouble ticket management application 220 obtains stored trouble ticket information from the system 100. At stage 430, the trouble ticket management application 220 determines a trouble ticket type for the selected trouble ticket. Depending on how a trouble ticket is opened determines how the trouble ticket should be closed. For example, the trouble ticket may be a measured trouble ticket. Accordingly, when closing the trouble ticket, the trouble ticket management application 220 has to account for trouble ticket information exclusive to measured trouble tickets. For example, that information may include determining and completing a customer credit along with an agreement with the customer on restored time. At stage 435, the trouble ticket management application 220 displays an activity log to the user. The user may review the activity log to obtain test results associated with the circuit, as well as test codes and information associated with testing of the circuit.

At stage 440, the trouble ticket management application 220 receives an analysis code associated with the trouble ticket. The analysis code is used to indicate problems experienced by the circuit in an efficient manner. For circuit problems that are not typical, the user may select a "general/other" analysis code. At stage 445, the trouble ticket management application 220 displays information related to a mutually agreed upon restoral time (MART) for circuit. The information can be used to determine and confirm when operation was restored to the circuit associated with the trouble ticket. At stage 450, the trouble ticket management application 220 uses a trouble code and other information associated with the trouble ticket to determine if billing is required for services rendered in resolving the circuit problems.

At stage 455, the trouble ticket management application 220 sends a customer associated with the circuit a message informing the customer about the MART. The trouble ticket management application 220 also receives a response from the customer/user indicating whether or not the customer agrees with the MART established by the trouble ticket management application 220. If the customer does not agree with the received MART, the trouble ticket management application 220 obtains information from the customer regarding reasons for the disagreement and forwards the information to a designated group, for example, a management group, for resolution. If the customer agrees with the MART established by the trouble ticket management application 220, at stage 460, the trouble ticket management application 220 provides trouble ticket information associated with the circuit to the user for verification. After the trouble ticket information is verified, at stage 465, the trouble ticket management application 220 closes the trouble ticket.

Figure 5:
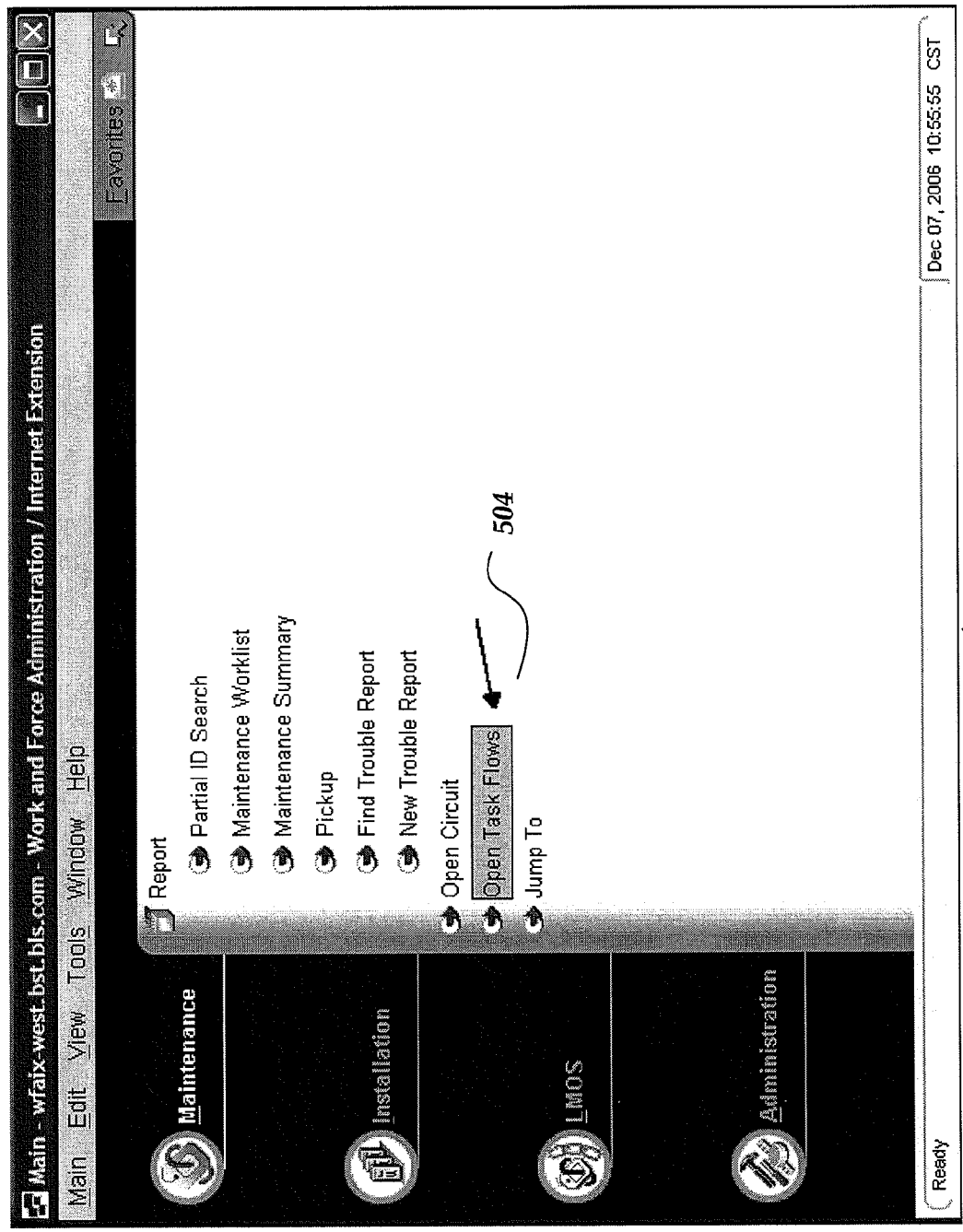
FIG. 5 is a screen shot illustrating a user interface for use with the computing device illustrated in FIG. 2.

FIG. 5 illustrates an exemplary user interface 500 for use in conjunction with the trouble ticket management application 220, according to one embodiment. The user interface 500 provides a user interface screen 502 that may be used when interacting with the trouble ticket management application 220. A user can obtain reports and other information about a circuit using the user interface screen 502. For example, the user may select an "Open Task Flows" option 504 to create a set of tasks for obtaining and managing trouble ticket information for a circuit. Accordingly, upon selecting the open task flow option, system 100 will provide the user with one or more user interface screens for opening a trouble ticket.

Figure 6:
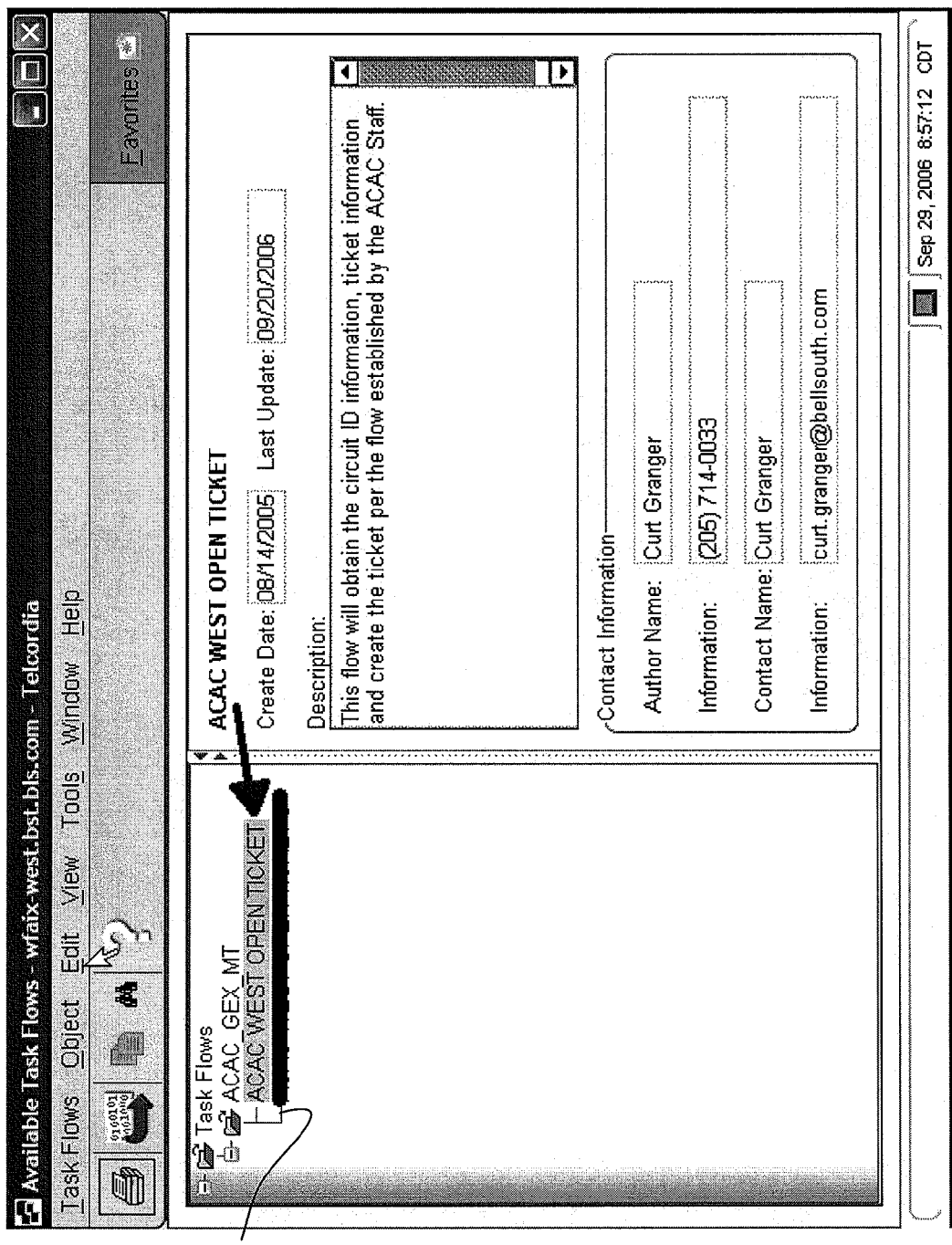
FIG. 6 is a screen shot further illustrating an exemplary open ticket process using the user interface shown in FIG. 5.

FIG. 6 illustrates an exemplary user interface 600 for use in conjunction with the trouble ticket management application 220, according to one embodiment. The user interface 600 provides a user interface screen 602 that may be used when interacting with the trouble ticket management application 220. Using the user interface screen 602, the user can obtain circuit information from a customer. The circuit information may be subsequently used by a telecommunications service provider to manage and repair problems associated with a given circuit in a telecommunications network. The user may obtain circuit information, for example, a circuit identification (ID) number, for establishing a set of tasks for inspecting and repairing the circuit.

Figure 7:
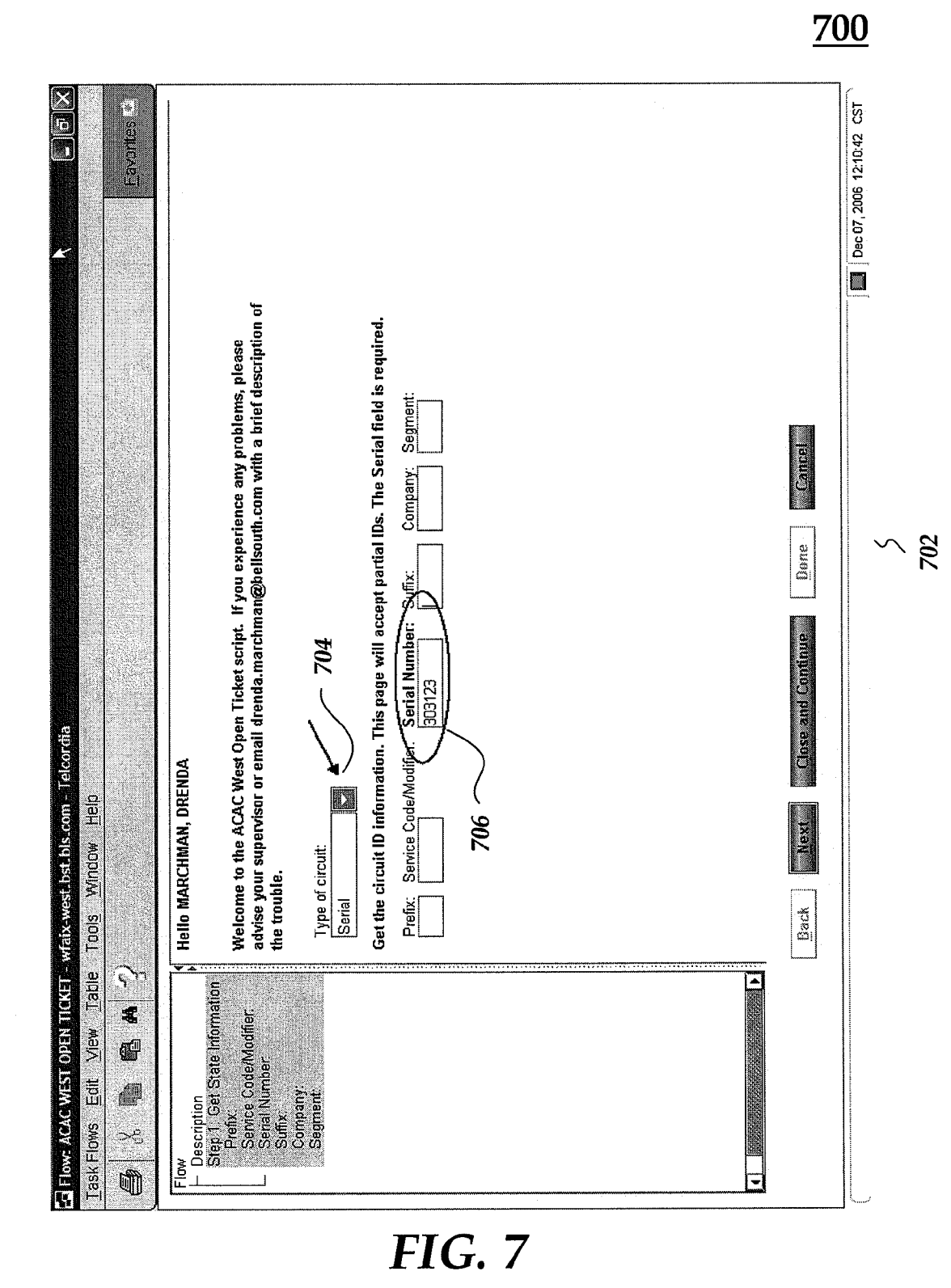

FIG. 7 illustrates an exemplary user interface 700 for use in conjunction with the trouble ticket management application 220, according to one embodiment. The user interface 700 provides a user interface screen 702 that may be used when interacting with the trouble ticket management application 220. Accordingly, the user may input information to designate a circuit type for the circuit reported by the customer in section 704. The user may also input other circuit related information using user interface screen 702; for example, the user can input a serial number associated with the circuit in section 706.

Figure 8:
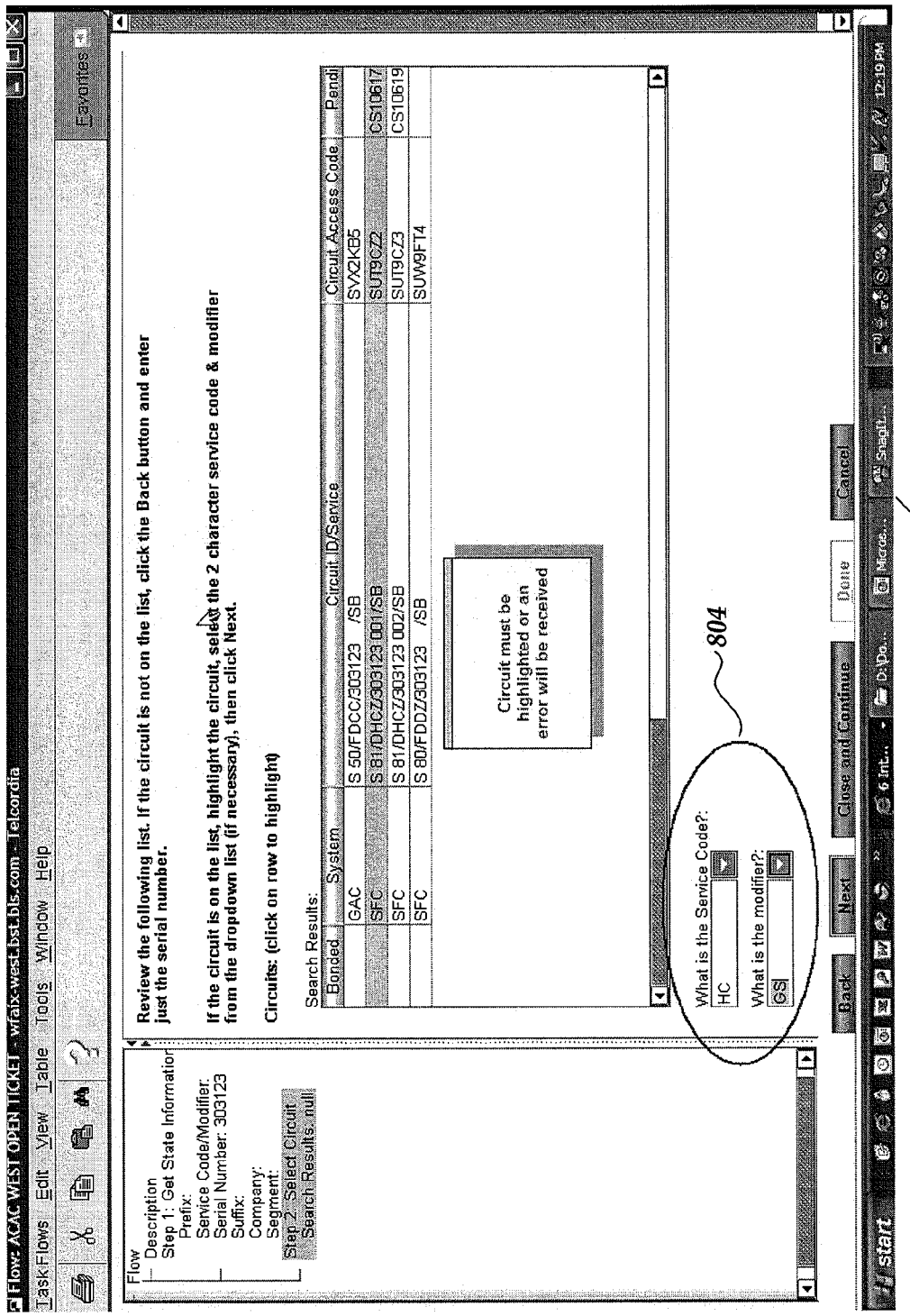
FIG. 8 is a screen shot further illustrating an exemplary open ticket process using the user interface of FIG. 5.

FIG. 8 illustrates an exemplary user interface 800 for use in conjunction with the trouble ticket management application 220, according to one embodiment. The user interface 800 provides a user interface screen 802 that may be used when interacting with the trouble ticket management application 220. In section 804, the user can input service code information for the circuit to indicate a level of service associated with the circuit and any service modifications, as is understood by those skilled in the art.

Figure 9:
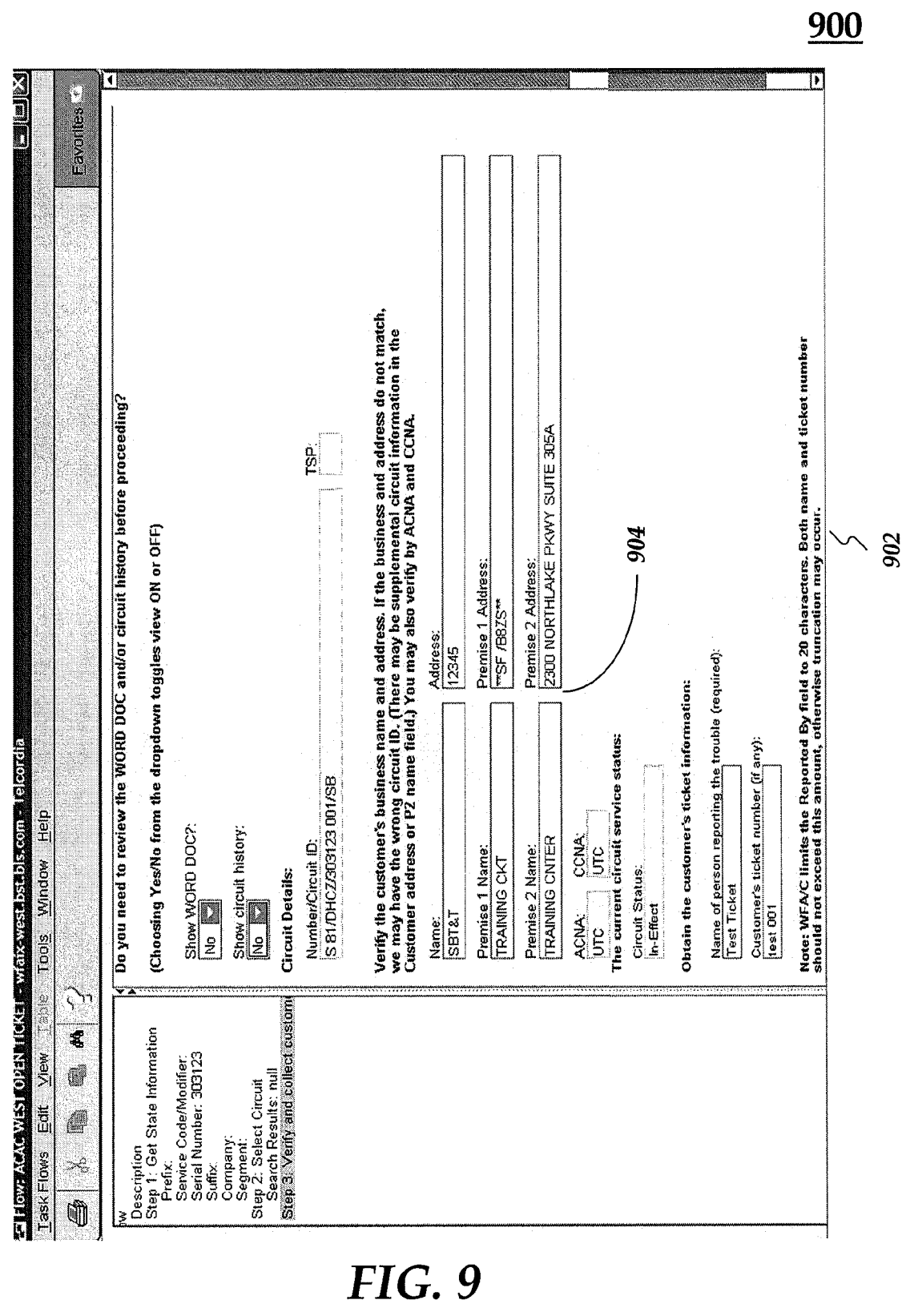

FIG. 9 illustrates an exemplary user interface 900 for use in conjunction with the trouble ticket management application 220, according to one embodiment. The user interface 900 provides a user interface screen 902 that may be used when interacting with the trouble ticket management application 220. The user may collect or verify customer location information in section 904, as well as other circuit information, for example, the circuit ID, using the user interface screen 902.

Figure 10:
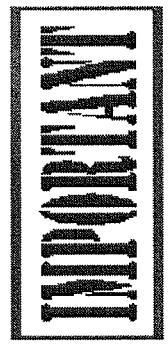
FIG. 10 is a screen shot further illustrating an exemplary open ticket process using the user interface of FIG. 5.

FIG. 10 illustrates an exemplary user interface 1000 for use in conjunction with the trouble ticket management application 220, according to one embodiment. The user interface 1000 provides a user interface screen 1002 that may be used when interacting with the trouble ticket management application 220. The user can input further circuit information using various check boxes, drop-down menus or any other means of inputting and selecting information. For example, in section 1004, the user can select a plurality of check boxes to indicate if problems for the reported circuit have been chronic, which may require additional inquiries and investigation.

FIG. 11 illustrates an exemplary user interface 1100 for use in conjunction with the trouble ticket management application 220, according to one embodiment. The user interface 1100 provides a user interface screen 1102 that may be used when interacting with the trouble ticket management application 220. The user can use user interface screen to input circuit error information associated with the circuit reported by the customer. For example, the user may receive and input information related to errors experienced by the customer when running one or more test patterns on the circuit.

FIG. 12 illustrates an exemplary user interface 1200 for use in conjunction with the trouble ticket management application 220, according to one embodiment. The user interface 1200 provides a user interface screen 1202 that may be used when interacting with the trouble ticket management application 220. Using user interface screen 1202, the user may enter additional information about the circuit, customer requests on accessing the circuit, test results associated with the circuit or the like.

Figure 13:
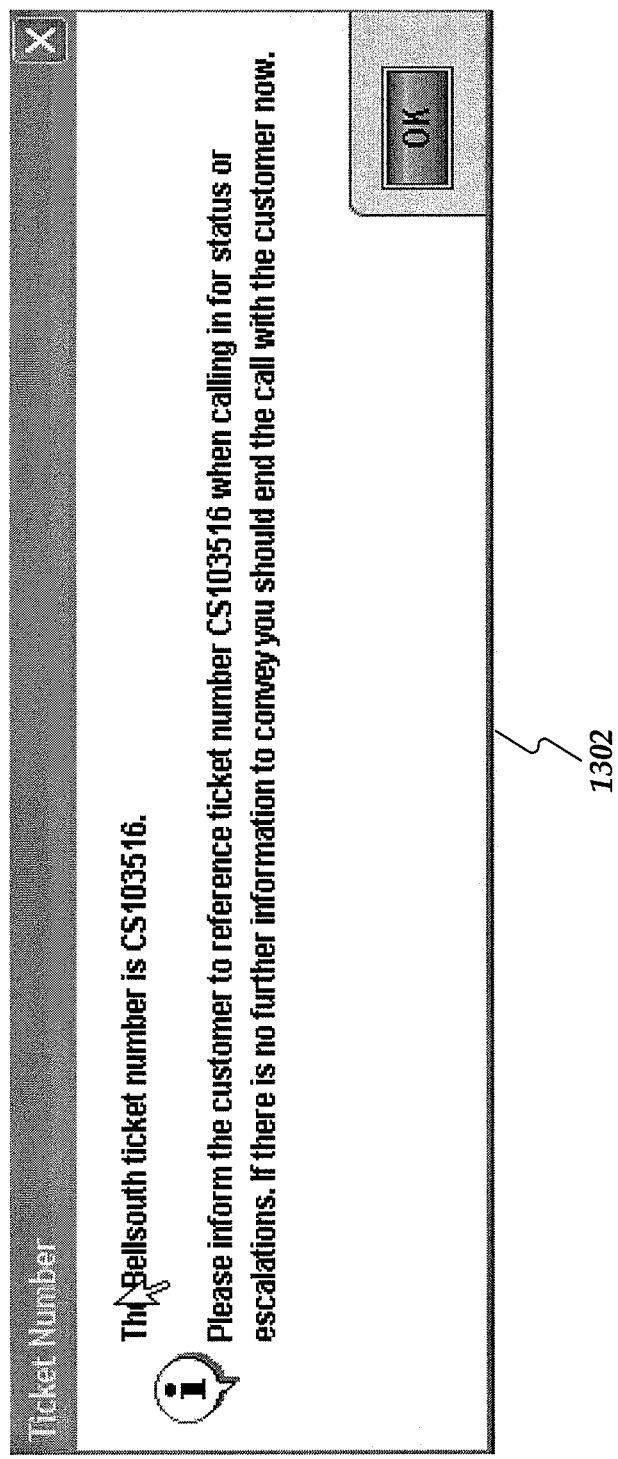
FIG. 13 is a screen shot further illustrating an exemplary open ticket process using the user interface of FIG. 5.

FIG. 13 illustrates an exemplary user interface 1300 for use in conjunction with the trouble ticket management application 220, according to one embodiment. The user interface 1300 provides a user interface screen 1302 that may be used when interacting with the trouble ticket management application 220. After receiving information in one or more user interface screen discussed in FIGS. 5-12, the system 100 generates a trouble ticket number for the reported circuit and instructs the user to provide information related to the generated trouble ticket to the customer on user interface screen 1302.

FIG. 14 illustrates an exemplary user interface 1400 for use in conjunction with the trouble ticket management application 220, according to one embodiment. The user interface 1400 provides a user interface screen 1402 that may be used when interacting with the trouble ticket management application 220. Using interface screen 1402, the user can review a circuit history to obtain information about previous problems associated with the circuit, input additional information about the circuit and the circuit history.

Figure 15:
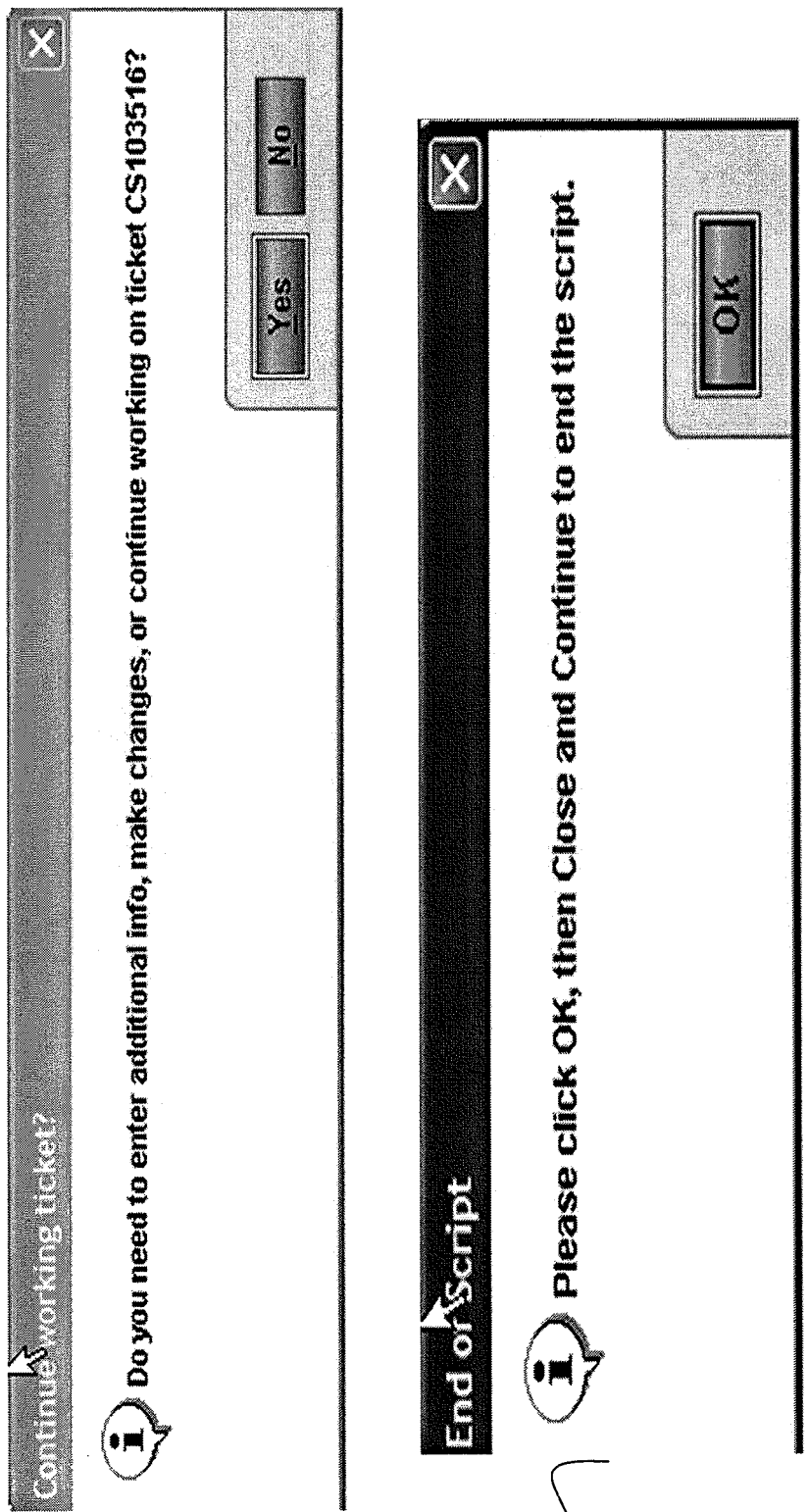
FIG. 15 is a screen shot further illustrating an exemplary open ticket process using the user interface of FIG. 5.

FIG. 15 illustrates an exemplary user interface 1500 for use in conjunction with the trouble ticket management application 220, according to one embodiment. The user interface 1500 provides a user interface screen 1502 and user interface screen 1504 that may be used when interacting with the trouble ticket management application 220. Using the user interface screen 1502, the trouble ticket management application 220 receives input from the user to determine if the user desires to enter additional information to the trouble ticket, to make changes to the trouble ticket, or to continue working on the trouble ticket or the like. If the user indicates that the user desires to work on the trouble ticket, the trouble ticket management application 220 displays the trouble ticket and allows the user to make additions and changes to the trouble ticket. If the user indicates that the trouble ticket is complete, the user can select a button, for example, an "OK" button, to indicate completion of the trouble ticket via user interface screen 1504.

Figure 16:
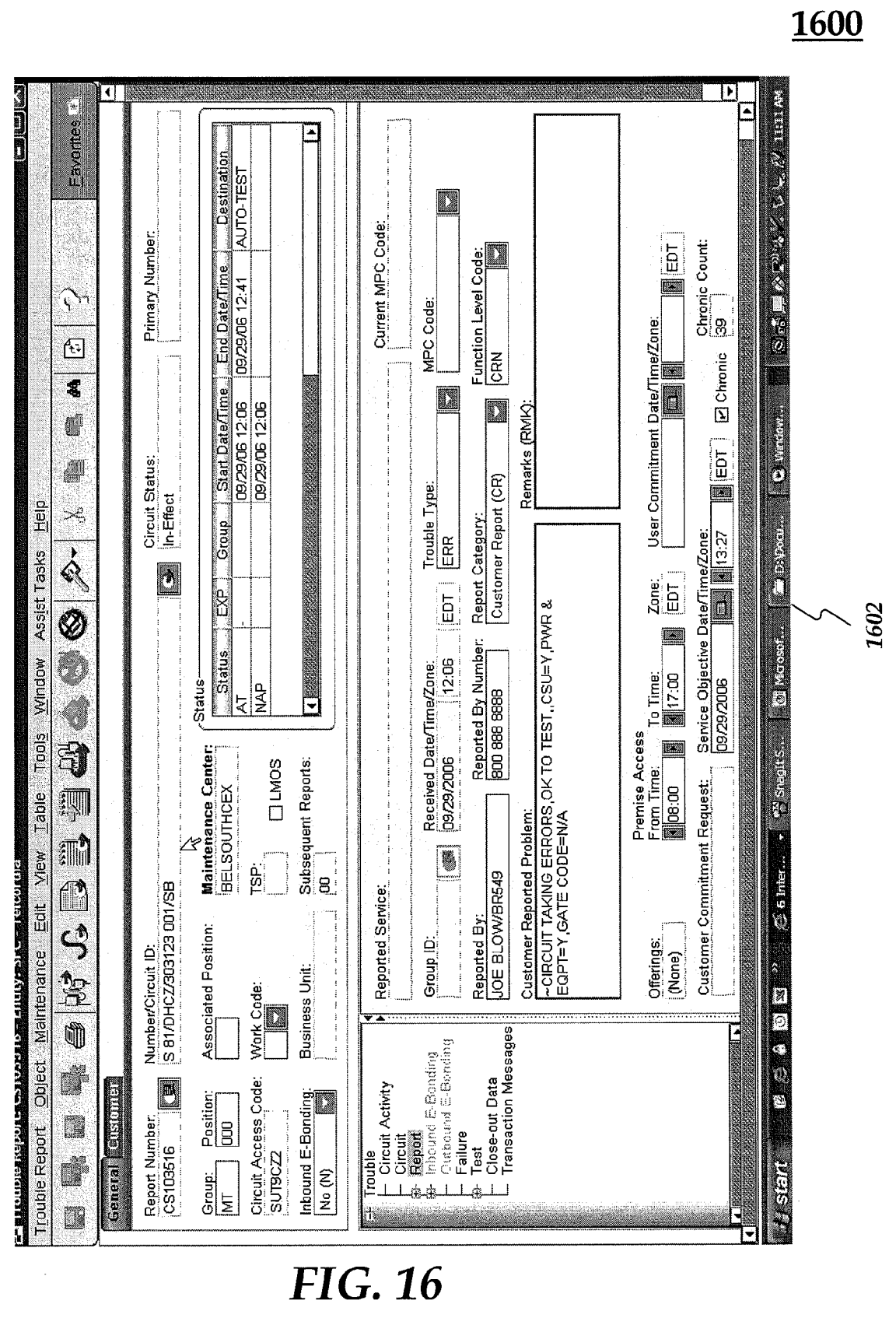

FIG. 16 illustrates an exemplary user interface 1600 for use in conjunction with the trouble ticket management application 220, according to one embodiment. The user interface 1600 provides a user interface screen 1602 that may be used when interacting with the trouble ticket management application 220. After indicating that the trouble ticket is complete using user interface screen 1504, the trouble ticket management application 220 displays circuit information and associated customer information for the circuit via user interface screen 1602.

Figure 17:
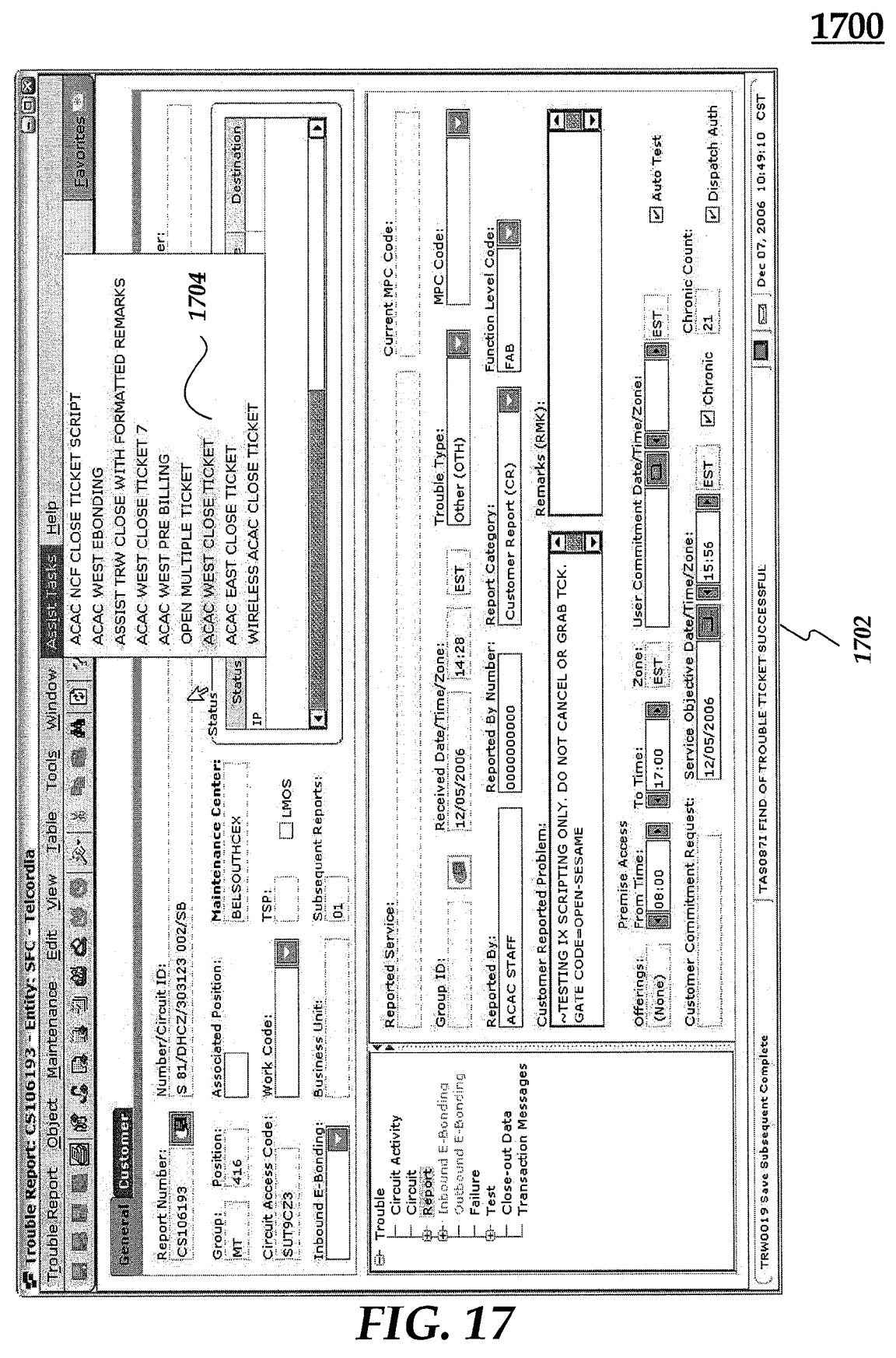

FIG. 17 illustrates an exemplary user interface 1700 for use in conjunction with the trouble ticket management application 220, according to one embodiment. The user interface 1700 provides a user interface screen 1702 that may be used when interacting with the trouble ticket management application 220. Upon repair of the circuit, or verification that the circuit is operating correctly, the user may close the trouble ticket for the circuit using user interface screen 1702. The user may select from a variety of options for closing the trouble ticket using drop-down menu 1704. Accordingly, upon selection of an option for closing the trouble ticket, trouble ticket management application 220 provides the user with one or more user interface screens for closing the trouble ticket.

Figure 18:
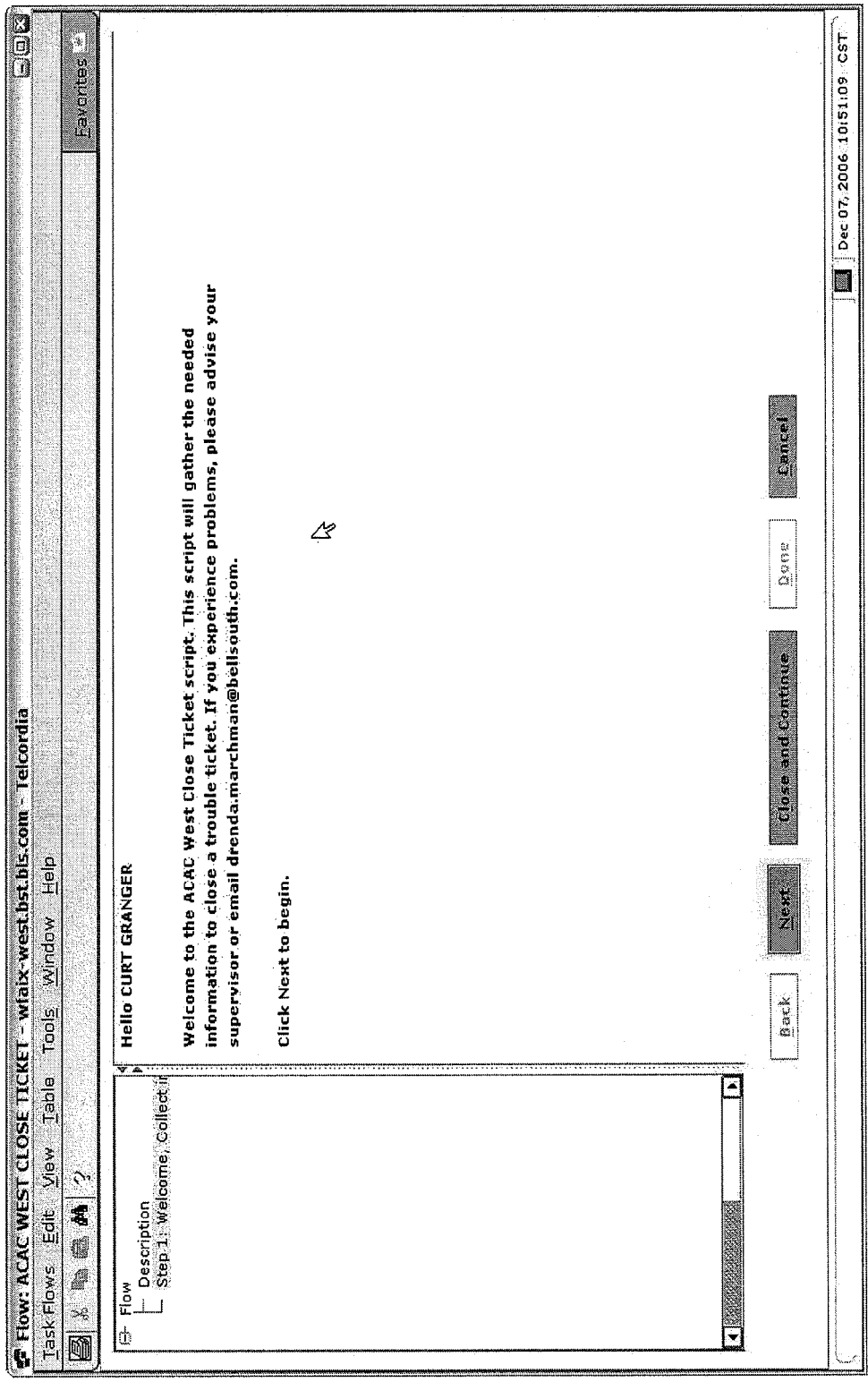
FIG. 18 is a screen shot further illustrating an exemplary close ticket process using the user interface of FIG. 5.

FIG. 18 illustrates an exemplary user interface 1800 for use in conjunction with the trouble ticket management application 220, according to one embodiment. The user interface 1800 provides a user interface screen 1802 that may be used when interacting with the trouble ticket management application 220. User interface screen 1802 informs the user that a process for closing a trouble ticket has been initiated and provides contact information that may be used if the user experiences problems closing the trouble ticket.

Figure 19:
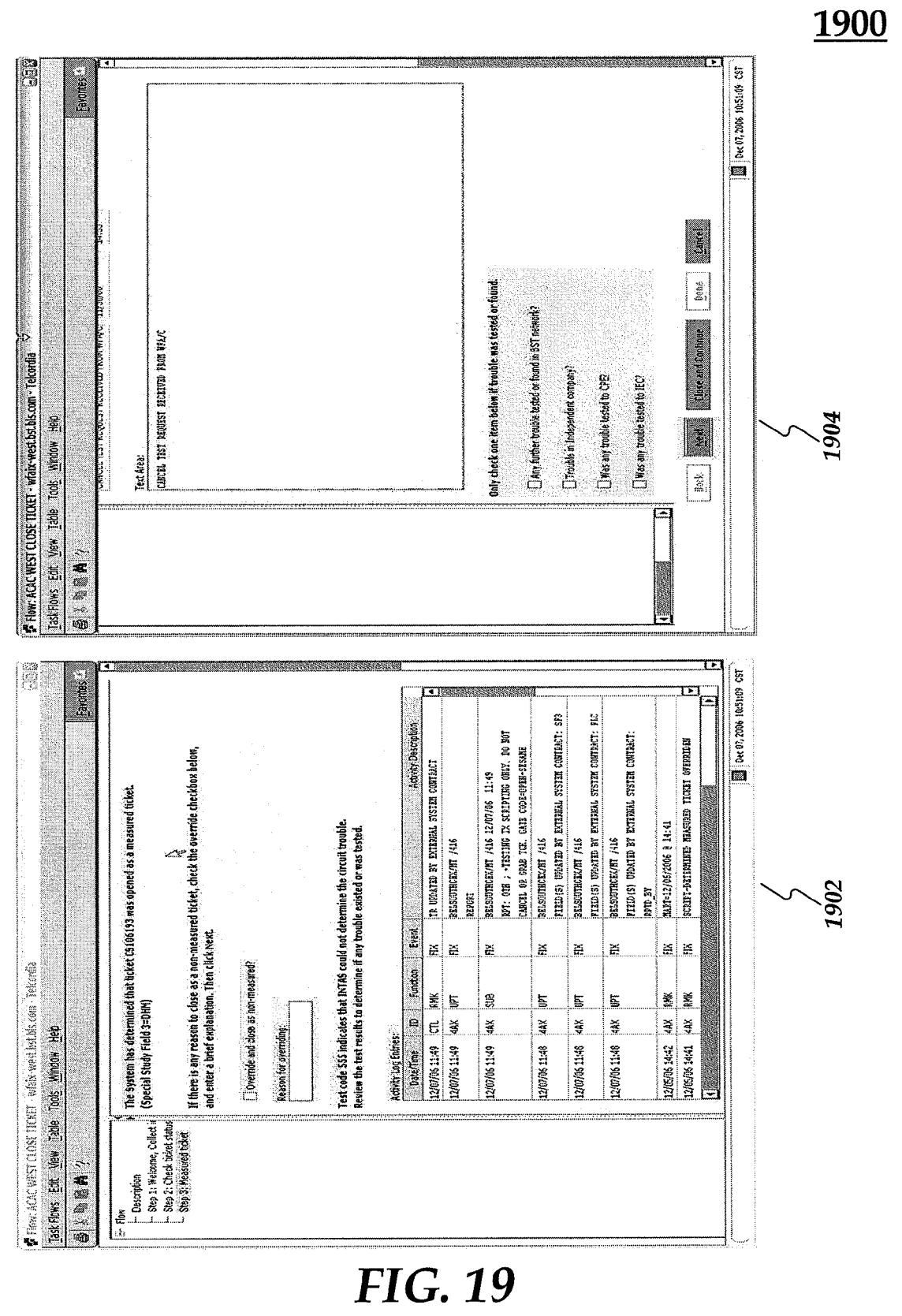

FIG. 19 illustrates an exemplary user interface 1900 for use in conjunction with the trouble ticket management application 220, according to one embodiment. The user interface 1900 provides user interface screens 1902 and 1904 that may be used when interacting with the trouble ticket management application 220. Based on an open trouble ticket selected for closing, the trouble ticket management application 220 determines if a reported circuit is a measured circuit or a non-measured circuit. This determination is provided to the user via user interface screen 1902. The user is also provided with test code information, an activity log for the circuit, and other circuit related information. User interface screen 1904 is a continuation of user interface screen 1902.

FIG. 20 illustrates an exemplary user interface 2000 for use in conjunction with the trouble ticket management application 220, according to one embodiment. The user interface 2000 provides user interface screens 2002 and 2004 that may be used when interacting with the trouble ticket management application 220. Using user interface screen 2002, the user may indicate what type of problems are being experienced by a circuit using a drop down list or any other means for indicating such problems. User interface screen 2004 is a continuation of user interface screen 2002 and provides the user with an activity log for the circuit and allows the user to edit a trouble code previously input for the circuit when opening the trouble ticket.

Figure 21:
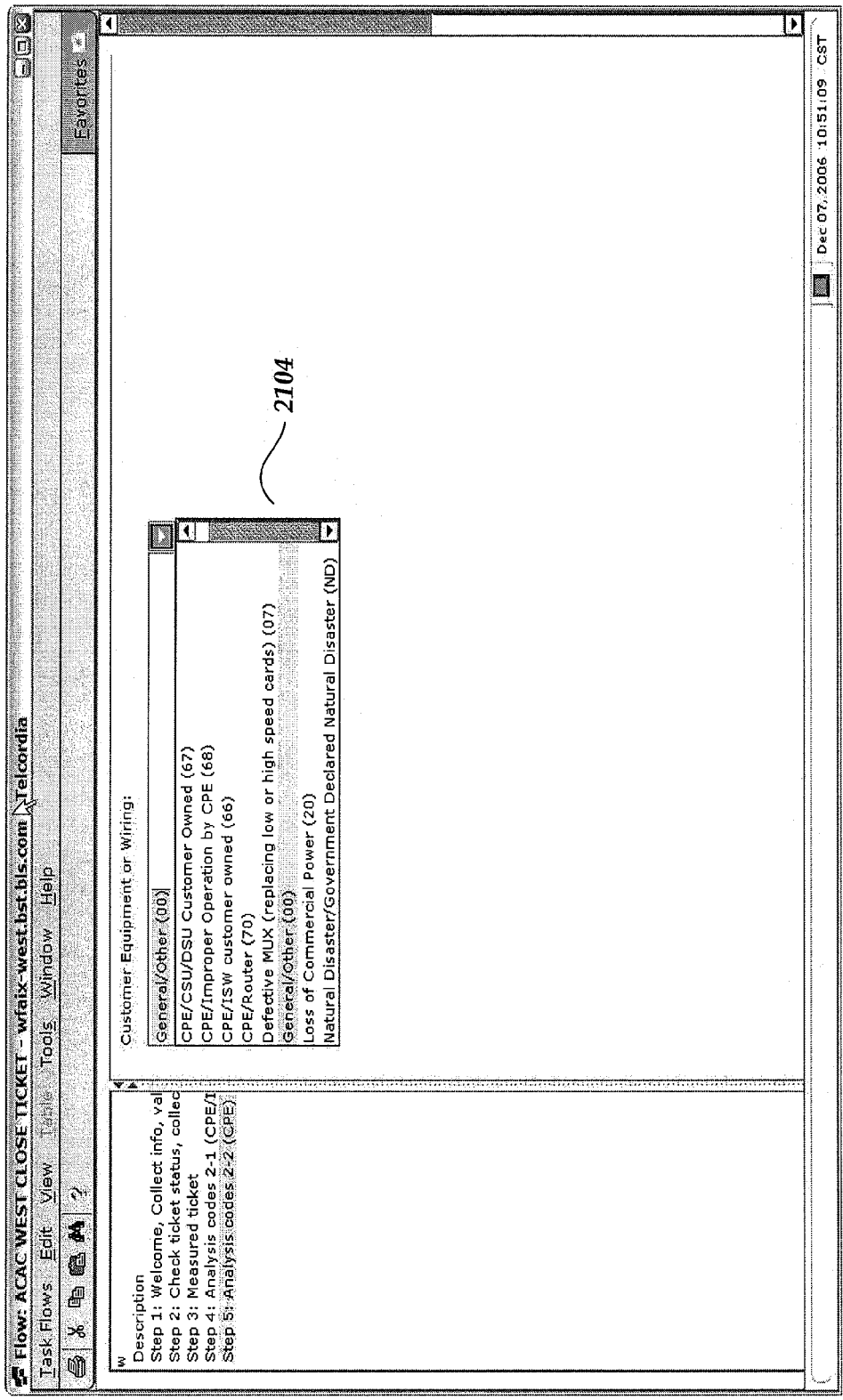
FIG. 21 is a screen shot further illustrating an exemplary close ticket process using the user interface of FIG. 5.

FIG. 21 illustrates an exemplary user interface 2100 for use in conjunction with the trouble ticket management application 220, according to one embodiment. The user interface 2100 provides a user interface screen 2102 that may be used when interacting with the trouble ticket management application 220. A user can input an analysis code in section 2104 to indicate the nature of the problems experienced by a customer when using a circuit. For example, the user can indicate that a related circuit within a telecommunications network has a defective multiplexer.

Figure 22:
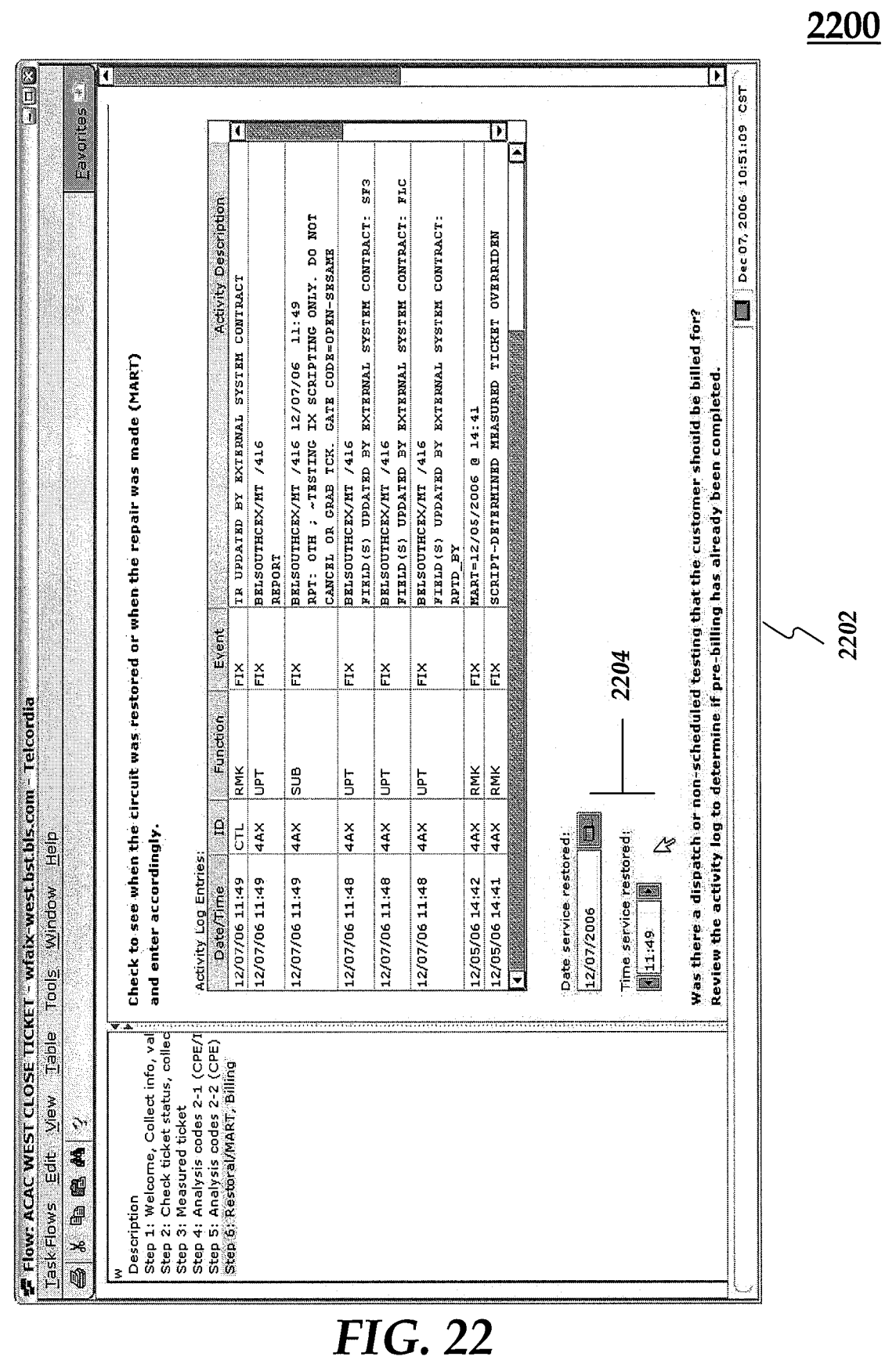

FIG. 22 illustrates an exemplary user interface 2200 for use in conjunction with the trouble ticket management application 220, according to one embodiment. The user interface 2200 provides a user interface screen 2202 that may be used when interacting with the trouble ticket management application 220. The trouble ticket management application 220 provides a user with an activity log for a circuit associated with an open trouble ticket via user interface screen 2202. By reviewing the activity log, the user can input date and time information in section 2204 to indicate when problems with the circuit have been corrected and telecommunications service restored to the customer. The date and time information input by the user in section 2204 is used to establish a MART for the circuit. Accordingly, the trouble ticket management application 220 can document the MART for use in determining repair efficiency and billing the customer for actual use of telecommunications service.

Figure 23:
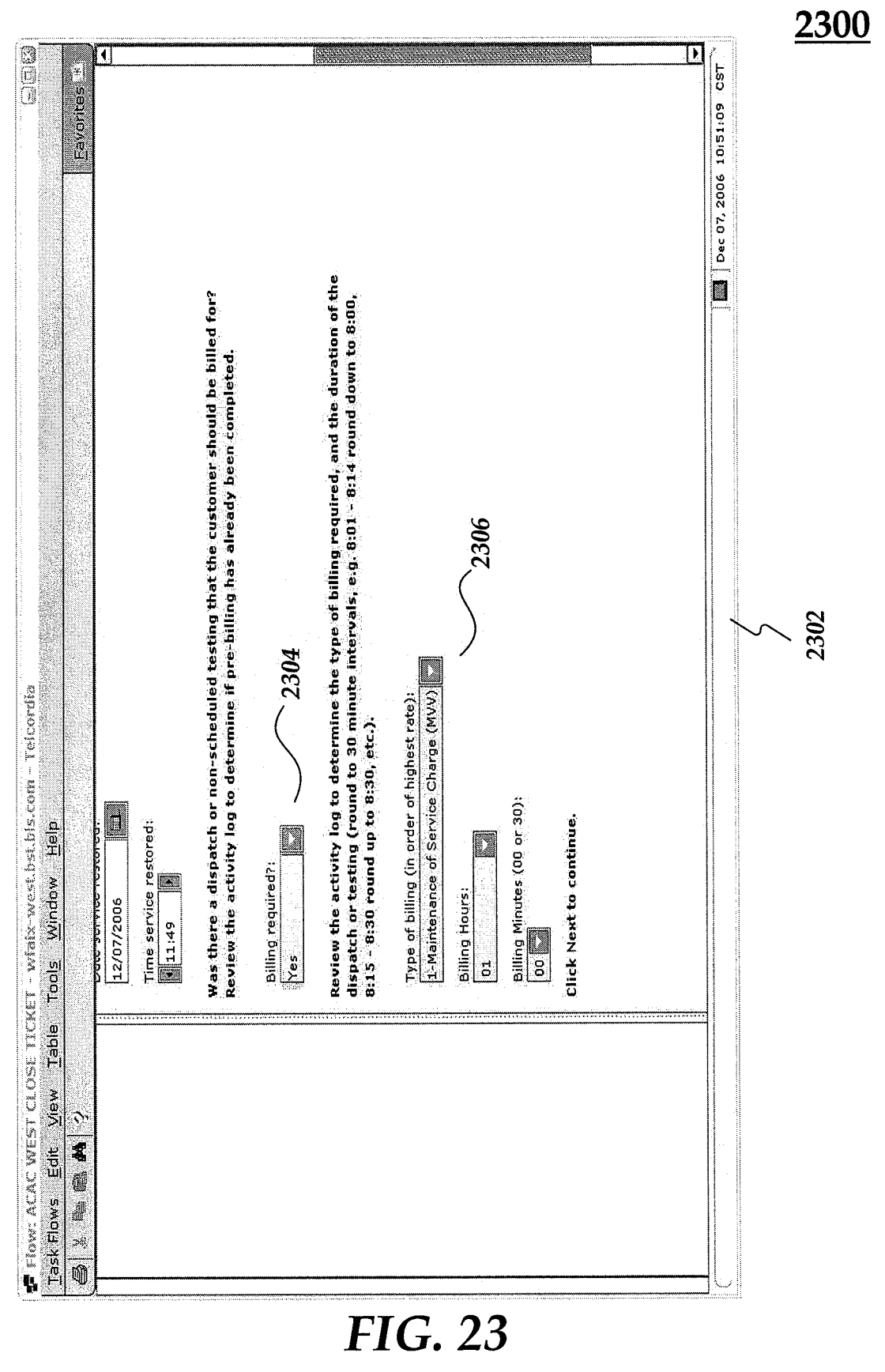

FIG. 23 is a continuation of user interface 2200 for use in conjunction with the trouble ticket management application 220, according to one embodiment. Using user interface screen 2202, the user can enter billing information associated with addressing problems for a customer's circuit. The user can indicate if billing a customer is required for addressing the problem in section 2206. For example, billing may not be required for a customer's specific circuit because the customer has a blanket repair agreement, or the repair was minor. If billing is required for the circuit, the user can indicate under what billing structure the customer will be charged in section 2208. For example, the customer may be charged under a maintenance of service charge billing structure. In addition, in section 2208, the user may indicate duration for addressing problems associated with the customer's circuit.

Figure 24:
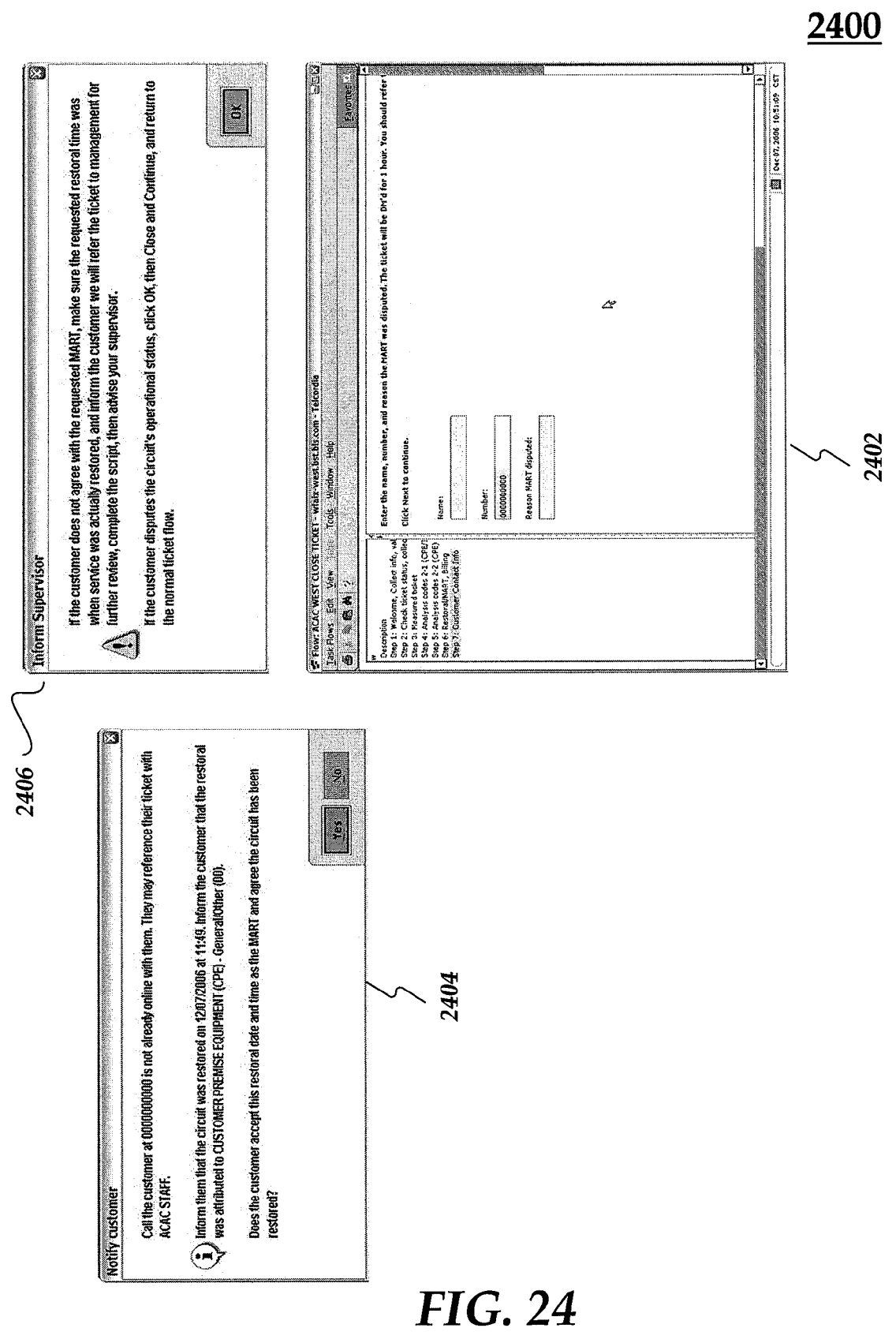

FIG. 24 illustrates an exemplary user interface 2400 for use in conjunction with the trouble ticket management application 220, according to one embodiment. The user interface 2400 provides user interface screens 2402, 2404 and 2406 that may be used when interacting with the trouble ticket management application 220. The trouble ticket management application 220 prompts a user to contact a customer associated with a trouble ticket in the process of being closed to inform the customer that telecommunications service has been restored, and other related information for an associated circuit via user interface screen 2402. The trouble ticket management application 220 prompts the user to determine if the customer agrees with the MART. If the customer agrees with the MART, billing information associated with the trouble ticket is maintained. If the customer disputes the MART, the user follows instructions presented on user interface screen 2404 regarding customer disapproval of the MART, and enters customer information and the customer's reason for disputing the MART via user interface screen 2406 for use by others, for example, customer service management, in resolving the dispute.

Figure 25:
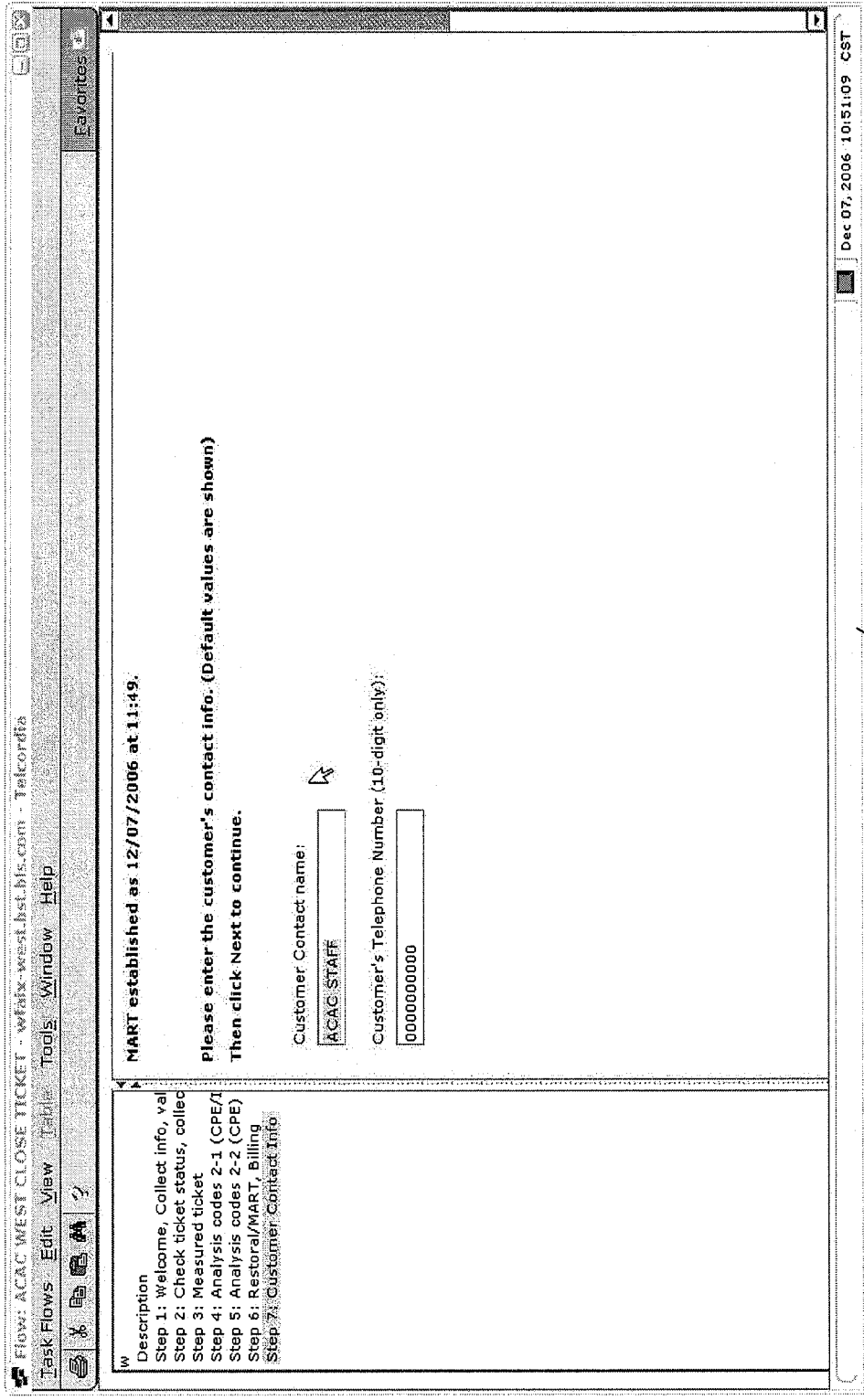
FIG. 25 is a screen shot further illustrating an exemplary close ticket process using the user interface of FIG. 5.

FIG. 25 illustrates an exemplary user interface 2500 for use in conjunction with the trouble ticket management application 220, according to one embodiment. The user interface 2500 provides a user interface screen 2502 that may be used when interacting with the trouble ticket management application 220. Once a consensus for the MART has been reached, a user may enter customer contact information via user interface screen 2502. For example, the customer contact information may help resolve a future dispute about the MART time by showing who agreed to that time.

Figure 26:
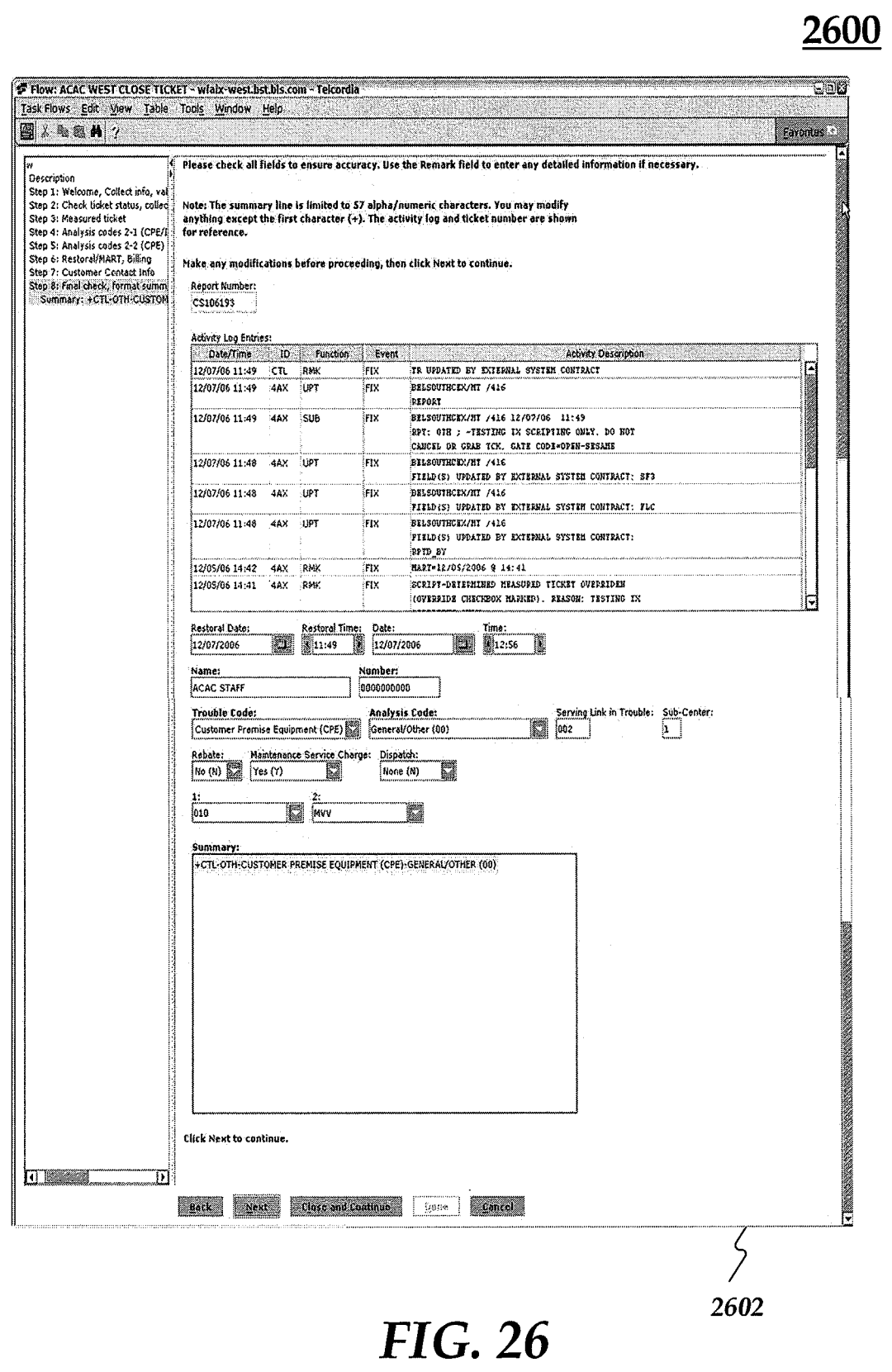

FIG. 26 illustrates an exemplary user interface 2600 for use in conjunction with the trouble ticket management application 220, according to one embodiment. The user interface 2600 provides a user interface screen 2602 that may be used when interacting with the trouble ticket management application 220. The trouble ticket management application 220 provides the user with a circuit's activity log, MART, trouble and analysis codes, and other information for review by the user prior to closing an associated trouble ticket for the circuit via user interface screen 2602. The user may also provide additional information about the circuit using the user interface screen 2602.

Figure 27:
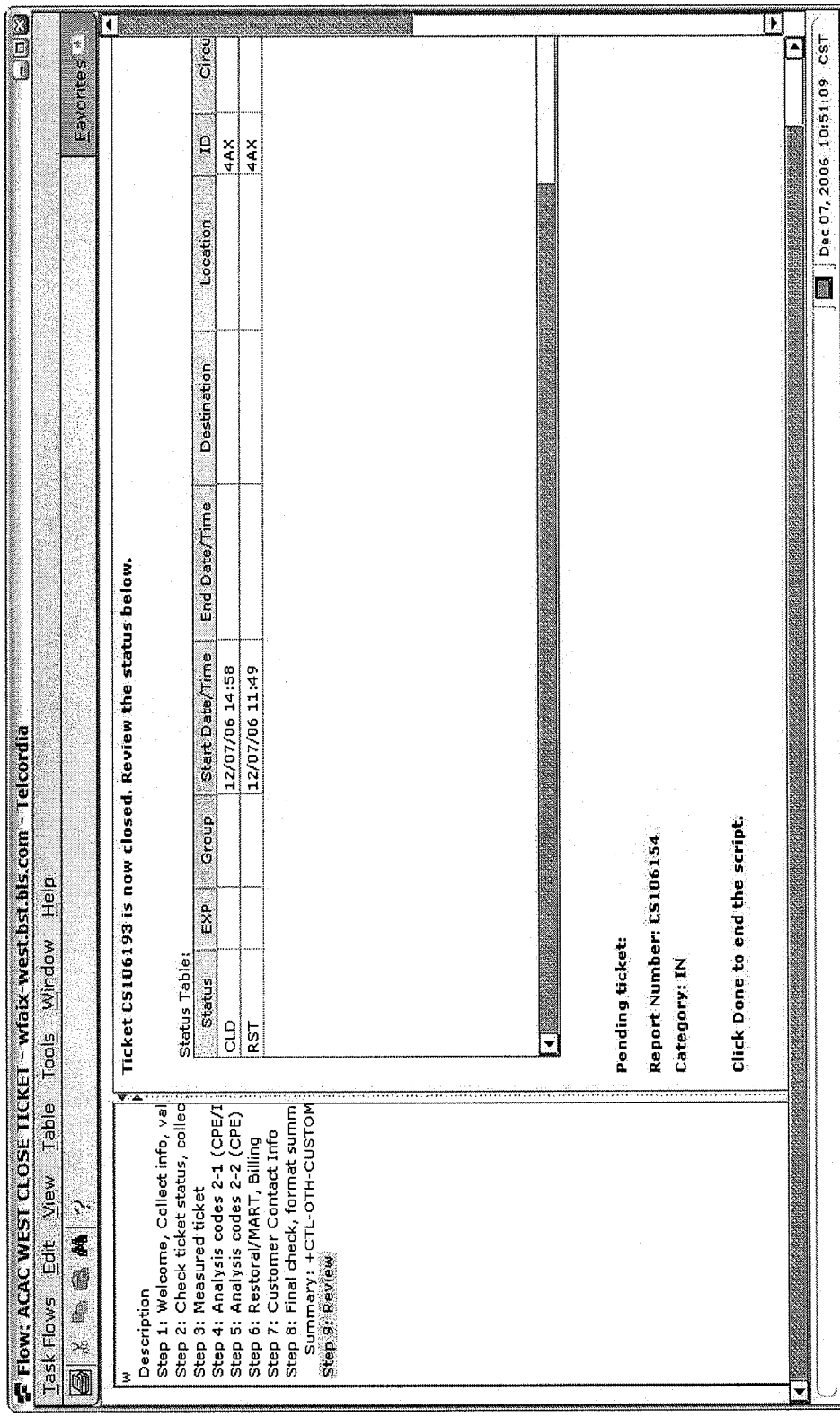
FIG. 27 is a screen shot further illustrating an exemplary close ticket process using the user interface of FIG. 5.

FIG. 27 illustrates an exemplary user interface 2700 for use in conjunction with the trouble ticket management application 220, according to one embodiment. The user interface 2700 provides a user interface screen 2702 that may be used when interacting with the trouble ticket management application 220. Upon an indication that trouble ticket information for a customer's circuit displayed via user interface screen 2600 is correct, a user may indicate approval of the trouble ticket information by, for example, clicking a "Next" button shown in the user interface 2600, FIG. 26. Accordingly, the trouble ticket management application 220 closes the trouble ticket and notifies the user that the trouble ticket is closed via user interface screen 2702.

Generally, consistent with exemplary embodiments, program modules may be used. Program modules may include routines, programs, components, data structures, and other types of structures that may perform particular tasks or that may implement particular abstract data types. Moreover, embodiments of the invention may be practiced with other computer system configurations, including hand-held devices, multiprocessor systems, microprocessor-based or programmable consumer electronics, minicomputers, mainframe computers, and the like. Embodiments of the invention may also be practiced in distributed computing environments where tasks are performed by remote processing devices that are linked through a communications network. In a distributed computing environment, program modules may be located in both local and remote memory storage devices.

Furthermore, exemplary embodiments of the invention may be practiced in an electrical circuit comprising discrete electronic elements, packaged or integrated electronic chips containing logic gates, a circuit utilizing a microprocessor, or on a single chip containing electronic elements or microprocessors. Embodiments of the invention may also be practiced using other technologies capable of performing logical operations such as, for example, AND, OR, and NOT, including but not limited to mechanical, optical, fluidic, and quantum technologies. In addition, embodiments of the invention may be practiced within a general-purpose computer or in any other circuits or systems.

Exemplary embodiments, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present invention may be embodied in hardware and/or in software (including firmware, resident software, micro-code, etc.). In other words, embodiments of the present invention may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Exemplary embodiments, for example, are described above with reference to block diagrams and/or operational illustrations of methods, systems, and computer program products according to embodiments of the invention. The functions/acts noted in the blocks may occur out of the order as show in any flowchart. For example, two blocks shown in succession may in fact be executed substantially concurrently or the blocks may sometimes be executed in the reverse order, depending upon the functionality/acts involved.

While certain embodiments have been described, other embodiments may exist. Furthermore, although embodiments have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the invention.

While the specification includes examples, the scope of the invention is indicated by the following claims. Furthermore, while the specification has been described in language specific to structural features and/or methodological acts, the claims are not limited to the features or acts described above. Rather, the specific features and acts described above are disclosed as example for embodiments of the invention.

What is claimed is:

1. A computer-implemented method, comprising:
   receiving, at a trouble ticket management application within a computing system including a computer-readable medium excluding a propagating signal and a propagation medium, instructions to open a trouble ticket;

receiving, at the trouble ticket management application, information related to a circuit type and a circuit identification (ID) number;

receiving, at the trouble ticket management application, information related to a service type for the circuit;

verifying, at the trouble ticket management application, the circuit type information, the circuit ID information and the service type information for the circuit;

receiving, at the trouble ticket management application, information related to circuit performance for the circuit;

opening, at the trouble ticket management application, a trouble ticket based on the received information, wherein the trouble ticket is associated with a trouble ticket type;

receiving, at the trouble ticket management application, instructions to close the trouble ticket;

determining, at the trouble ticket management application, the trouble ticket type associated with the trouble ticket; and closing, at the trouble ticket management application, the trouble ticket based on the trouble ticket type.

2. The computer-implemented method of claim 1 further comprising determining whether the trouble ticket is for a measured trouble ticket or a non-measured trouble ticket.

3. The computer-implemented method of claim 2 further comprising associating a first set of billing rules to the trouble ticket when the trouble ticket is a measured trouble ticket and associating a second set of billing rules to the trouble ticket when the trouble ticket is a non-measured trouble ticket.

4. The computer-implemented method of claim 1 further comprising receiving service code modifier information for the circuit.

5. The computer-implemented method of claim 1 further comprising determining a circuit status for the circuit.

6. The computer-implemented method of claim 1 further comprising displaying a circuit history for the circuit.

7. The computer-implemented method of claim 1 further comprising receiving information for determining a location of problems associated with the circuit.

8. A non-transitory computer-readable medium, excluding a propagated signal and a propagation medium, having instructions recorded thereon which, when executed by a computing system, cause the computing system to perform a method comprising:

receiving instructions to open a trouble ticket;

receiving information relating to a circuit type and a circuit identification;

receiving information relating to a service type associated with the identified circuit;

receiving information indicating trouble associated with the identified circuit;

opening a trouble ticket for the identified circuit, the trouble ticket including a service history of the identified circuit, wherein the trouble ticket is associated with a trouble ticket type;

receiving instructions to close the trouble ticket;

determining the trouble ticket type associated with the trouble ticket; and closing the trouble ticket based on the trouble ticket type.

9. The non-transitory computer-readable medium of claim 8, wherein the method further comprises:

receiving information determining whether the trouble ticket is a measured trouble ticket or a non-measured trouble ticket; and determining whether billing is required for services rendered in resolving the trouble associated with the identified circuit.

10. The non-transitory computer-readable medium of claim 8, wherein the method further comprises:

determining whether billing information should be associated with the open trouble ticket;

automatically entering predetermined information relating to the trouble ticket based on information received from a customer; and using the predetermined information to bill the customer, in response to closing the trouble ticket.

11. A system for opening and closing a trouble ticket, comprising:

a memory storage including a computer-readable medium excluding a propagated signal and a propagation medium, for storing one or more scripts and programs;

a processing unit coupled to the memory storage, wherein the processing unit is operative to control the one or more scripts and programs and wherein the memory storage stores:

an open trouble ticket script for opening a trouble ticket for the circuit, wherein a trouble ticket type is associated with the trouble ticket;

a close trouble ticket script for closing the trouble ticket for the circuit, including determining the trouble ticket type associated with the trouble ticket, wherein the trouble ticket is closed based on the trouble ticket type; and a billing script and program for determining whether billing information should be associated with an open trouble ticket and managing the billing information when the billing information is associated with an open trouble ticket.

12. The system of claim 11, wherein the close trouble ticket script includes processes and information related to a predetermined system practice and tariff rules.

13. The system of claim 11, wherein the billing script includes miscellaneous service charge rules and rebate rulings for use when the open trouble ticket is a measured trouble ticket.

14. The system of claim 11 further comprising a circuit log for storing information associated with the circuit.

15. The system of claim 11, wherein the system automatically enters predetermined information related to a trouble ticket based on information received from a customer.

16. The system of claim 15, wherein the predetermined information is used to bill the customer.

17. The computer-implemented method of claim 1, wherein the trouble ticket type is indicative of how the trouble ticket is opened, and the trouble ticket is closed based on how the trouble ticket is opened.

18. The computer-implemented method of claim 1, further comprising determining a mutually agreed upon restoral time for the circuit for a customer associated with the trouble ticket.

19. The non-transitory computer-readable medium of claim 8, wherein the trouble ticket type is indicative of how the trouble ticket is opened, and the trouble ticket is closed based on how the trouble ticket is opened.

20. The device of claim 11, wherein the trouble ticket type is indicative of how the trouble ticket is opened, and the trouble ticket is closed based on how the trouble ticket is opened.

* * * * *